(12) United States Patent
Hanchinal et al.

(10) Patent No.: US 9,880,949 B1
(45) Date of Patent: Jan. 30, 2018

(54) CROSS CLOCK COMPENSATION BETWEEN LAYERS IN PERIPHERAL COMPONENT INTERCONNECT EXPRESS

(71) Applicant: Microsemi Solutions (U.S.), Inc., Aliso Viejo, CA (US)

(72) Inventors: Kiran Hanchinal, Bangalore (IN); Kuan Hua Tan, Coquitlam (CA); Richard David Sodke, Burnaby (CA); Mansi Mehrotra, Gautam Budh Nagar district (IN)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 0 days.

(21) Appl. No.: 14/966,240

(22) Filed: Dec. 11, 2015

(51) Int. Cl.
*G06F 13/28* (2006.01)
*G06F 13/10* (2006.01)
*G06F 13/42* (2006.01)
*G06F 13/40* (2006.01)

(52) U.S. Cl.
CPC .......... *G06F 13/102* (2013.01); *G06F 13/28* (2013.01); *G06F 13/4068* (2013.01); *G06F 13/4282* (2013.01)

(58) Field of Classification Search
CPC .......... G06F 13/28; G06F 13/40; G06F 13/42
See application file for complete search history.

(56) References Cited

U.S. PATENT DOCUMENTS

| | | | | |
|---|---|---|---|---|
| 5,835,736 A * | 11/1998 | Maeda | ............... | G06F 11/1407 710/106 |
| 6,201,789 B1 * | 3/2001 | Witkowski | ........... | H04Q 3/0091 370/230 |
| 6,570,848 B1 * | 5/2003 | Loughran | ........... | H04L 12/5602 370/230.1 |
| 8,774,016 B2 * | 7/2014 | Lu | ......................... | H04L 12/413 370/249 |
| 9,219,560 B2 * | 12/2015 | Hummel | ................ | H04J 3/047 |
| 9,478,272 B1 * | 10/2016 | Grenier | ................ | G11C 7/1075 |
| 2001/0050913 A1 * | 12/2001 | Chen | ................... | H04L 12/5602 370/360 |
| 2004/0156463 A1 * | 8/2004 | Goodloe | ............... | H04J 3/0626 375/362 |
| 2007/0195761 A1 * | 8/2007 | Tatar | .................. | H04L 49/1546 370/389 |

(Continued)

*Primary Examiner* — Henry Tsai
*Assistant Examiner* — Christopher A Daley
(74) *Attorney, Agent, or Firm* — Leber IP Law; Dennis R. Haszko

(57) ABSTRACT

A PCIe bus adapted for cross clock compensation of asynchronous clocks includes one or more PHY data ports provided in a PHY layer having a transmit clock (TCLK) for timing data transmitted to a peripheral device and a receive clock (RCLK) for timing data received from the peripheral device, one or more media access control (MAC) ports provided in a MAC layer having an interface clock (PCLK) for timing data transmitted to the PHY layer and data received from the PHY layer, wherein the PCLK and one or both of the TCLK and the RCLK are asynchronous, and one or more backpressure ports at an interface between the PHY layer and the MAC layer for controlling reading and writing of one of the PHY layer and the MAC layer. In some aspects, the PCLK frequency is set to be always greater than a maximum frequency of the RCLK and the TCLK.

20 Claims, 19 Drawing Sheets

(56) References Cited

U.S. PATENT DOCUMENTS

| | | | |
|---|---|---|---|
| 2009/0103556 A1* | 4/2009 | Naven | H04J 3/0685 |
| | | | 370/413 |
| 2012/0275301 A1* | 11/2012 | Xiong | H04L 49/357 |
| | | | 370/230 |
| 2014/0129867 A1 | 5/2014 | Caruk et al. | |
| 2014/0321473 A1* | 10/2014 | Chen | H04L 49/90 |
| | | | 370/417 |
| 2015/0003466 A1* | 1/2015 | Soffer | H04L 47/34 |
| | | | 370/412 |
| 2016/0065484 A1* | 3/2016 | Suzuki | H04L 47/623 |
| | | | 370/415 |

\* cited by examiner

CROSS CLOCK COMPENSATION BETWEEN LAYERS IN PERIPHERAL COMPONENT INTERCONNECT EXPRESS

FIELD

The present disclosure relates to cross clock compensation between layers in Peripheral Component Interconnect express bus.

BACKGROUND

Peripheral Component Interconnect express (PCIe) is a serial bus standard for connecting a computer to one or more peripheral devices. PCIe utilizes a layered protocol consisting of a transaction layer, a data link layer, and a physical (PHY) layer. The data link layer includes a media access control (MAC) layer.

PHY Interface for the PCI Express Architecture (PIPE) is a standard for an interface between the PHY layer and the MAC layer in PCIe Architecture. The PHY layer and the MAC layer utilize clock signals of predetermined frequencies. The clock signals controls when data flows to and from the PHY layer and the MAC layer. Frequencies of the clock signals are determined based on speeds specified by the PCIe protocol. For example, PCIe first generation protocol (Gen1) specifies a data transfer speed of 2.5 Gbps. Accordingly, Gen1 clock signals have a frequency of 125 MHz. PCIe second generation protocol (Gen2) specifies a data transfer speed of 5 Gbps and therefore, Gen2 clocks signals have a frequency of 250 MHz. Similarly, PCIe third generation protocol (Gen3) specifies a data transfer speed of 8 Gbps and have clock signals of frequency 500 MHz. The clock signals utilized by the PHY layer and the MAC layer may have different frequencies.

The differences in frequencies of the clock signals may result in a loss or corruption of data.

BRIEF DESCRIPTION OF THE DRAWINGS

The following detailed description references the drawings, wherein.

DETAILED DESCRIPTION

The following describes a Peripheral Component Interconnect express (PCIe) bus for cross clock compensation of asynchronous clocks of the PCIe bus utilizing one or more backpressure ports at an interface between a physical (PHY) layer and a media access control (MAC) layer. The backpressure ports are utilized for controlling the reading or writing of either the PHY layer or MAC layer, or both, such that the variations of the clocks of the PCIe bus may be compensated for without, for example, including SKIP ordered sets within data flows.

Figure 1:
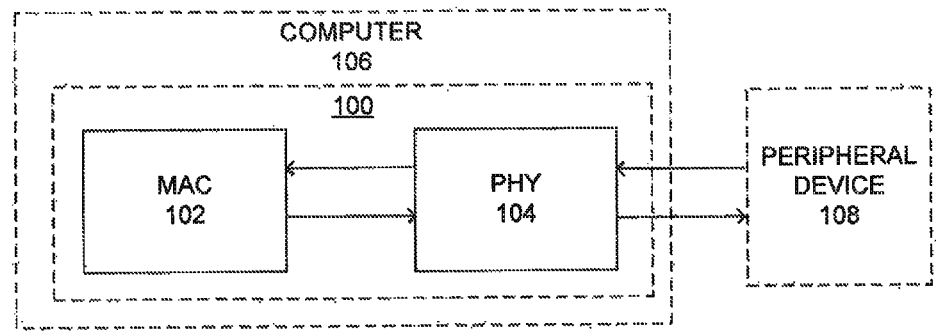
FIG. 1 is a block diagram of a typical PCIe bus according to the prior art.

PCIe has numerous improvements compared to older standards, such as peripheral component interconnect (PCI), peripheral component interconnect extended (PCI-X), and accelerated graphics port (AGP). The improvements include a higher throughput, lower input/output pin count, and a more detailed error detection and reporting mechanism. PCIe utilizes a protocol consisting of a transaction layer, a data link layer, and a physical (PHY) layer. The data link layer includes a media access control (MAC) layer. A standard for an interface between the PHY layer and the MAC layer is given by PHY Interface for the PCI Express Architecture (PIPE) as shown in FIG. 1. FIG. 1 shows a PCIe bus 100 according to the prior art. The PCIe bus includes a MAC layer 102 and a PHY layer 104. The PCIe interface may be provided inside a computer 106 and the PHY layer 104 communicates with a peripheral device 108.

Figure 2:
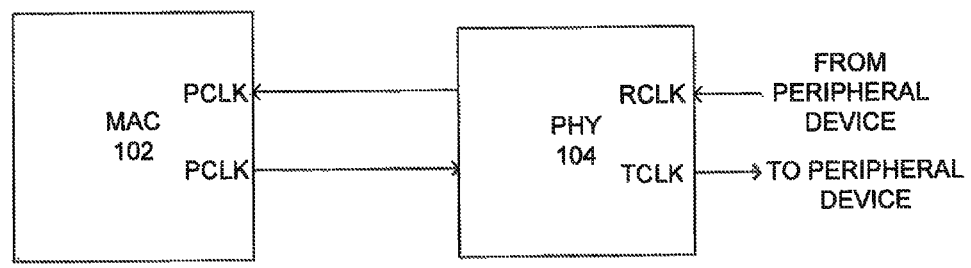
FIG. 2 is a block diagram of clock signals operating in the MAC layer and the PHY layer of a typical PCIe bus according to the prior art.

A timing of data flow into and out of a layer, such as the MAC layer 102 and the PHY layer 104 of the PCIe bus shown in FIG. 1, is controlled by sets of clock signals. FIG. 2 illustrates the various sets of clock signals. As shown in FIG. 2, a transmit clock (TCLK) is a set of clock signals which determines when data is written by the PHY layer 104 to a peripheral device 108. Similarly, a receive clock (RCLK) is a set of clock signals which determines when data sent by the peripheral device 108 is read by the PHY layer 104. A PIPE interface clock (PCLK) is a set of clock signals which determines when data is written by the MAC layer 102 to the PHY layer 104 and when data from the PHY layer 104 is read by the MAC layer 102.

A clock generator generating the clock signals may have an inherent inaccuracy due to which the actual frequency of the clock signals is slightly different from a rated frequency of the clock signals. The difference in frequency of the clock signals from the rated frequency is measured in parts per million (PPM). PPM variation of a set of clock signals can be defined as number of clock signals skewed per million clock signals. For example, when a set of clock signals having a frequency of 500 MHz is said to have a PPM variation of 300, 300 clock signals are skewed every one million clock signals, or one clock signal is skewed once in every 3333 clock signals. A time period corresponding to a PPM variation N is given by:

$$N \times t_{clock}/10^6;$$

where $t_{clock}$ is time period of the set of clock signals.

Thus, a time period corresponding to a 300 PPM variation for a set of clock signals having a frequency of 500 MHz is 0.6 picoseconds. The PPM variation of the set of clock signals follows a sinusoidal variation. Thus, the time period of the 500 MHz set of clock signals oscillates from 2 ns+0.6 ps to 2 ns−0.6 ps. In other words, the frequency of the 500 MHz set of clock signals oscillates from 499.85 MHz to 500.15 MHz.

The TCLK, the RCLK, and the PCLK may have a common set of reference clock signals or different sets of reference clock signals. Two sets of clock signals having a common set of reference clock signals will have zero PPM variation. A scheme in which two sets of clock signals have a common set of reference clock signals is hereinafter referred to as common clocking scheme. However, when the two sets of clock signals have different sets of reference clock signals, the PPM variation exists between the two clock signals as different sets of reference clock signals are asynchronous with respect to each other. A scheme in which two sets of clock signals have different sets of reference clock signals is hereinafter referred to as an asynchronous clocking scheme.

Figure 3:
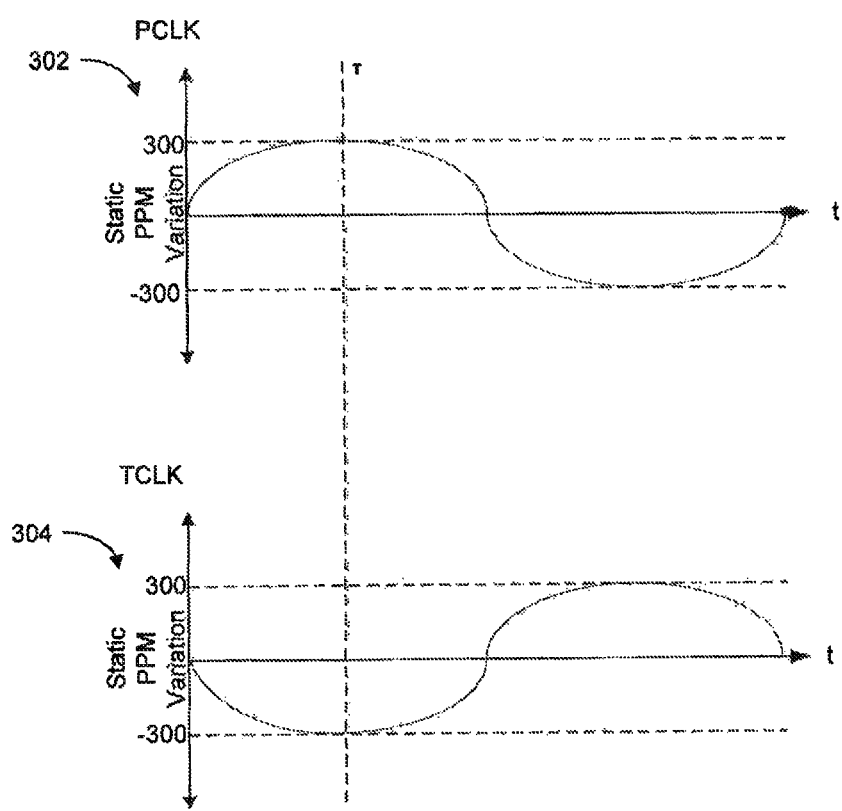
FIG. 3 is a graph of parts per million (PPM) variations of frequencies as a function of time for the TCLK and the POLK.

FIG. 3 shows a chart 302 of an example PPM variation of a PCLK relative to its associated reference clock, and a chart 304 of an example PPM variation of a TCLK relative to its associated reference clock. In the example shown in FIG. 3, the PCLK and the TCLK have different reference clock signals.

In the example shown in FIG. 3, the PPM variations of the PCLK and TCLK are out of phase such that, at a time instance t=T, the PPM variation between the two sets of clock signals is at its maximum. At the time instance t=T, PPM variation of the PCLK is +300 PPM and the PPM variation of the TCLK is −300 PPM, and therefore, the PPM variation between the two sets of clock signals is 600 PPM. The PPM variation between sets of clock signals due to the inherent inaccuracy of clock generators generating the sets of clock signals is hereinafter referred to as static PPM variation. The maximum and minimum permissible values of static PPM variations of a set of clock signals as per PCIe specification are +300 PPM and −300 PPM, respectively.

In addition to the static PPM variation between the sets of clock signals having the different sets of reference clock signals, additional PPM variation is introduced due to modulation of frequency of the clock signals. The modulation of the frequency of the clock signals is called spread spectrum clocking (SSC) and is performed to reduce electromagnetic interference generated by the clock signals. The set of clock signals undergoing SSC are hereinafter referred to as SSC clock signals. The maximum permissible value of PPM variation of the SSC clock signals due to SSC as per the PCIe specification is −5000 PPM. The PPM variation between two sets of SSC clock signals due to SSC is hereinafter referred to as SSC PPM.

Figure 4:
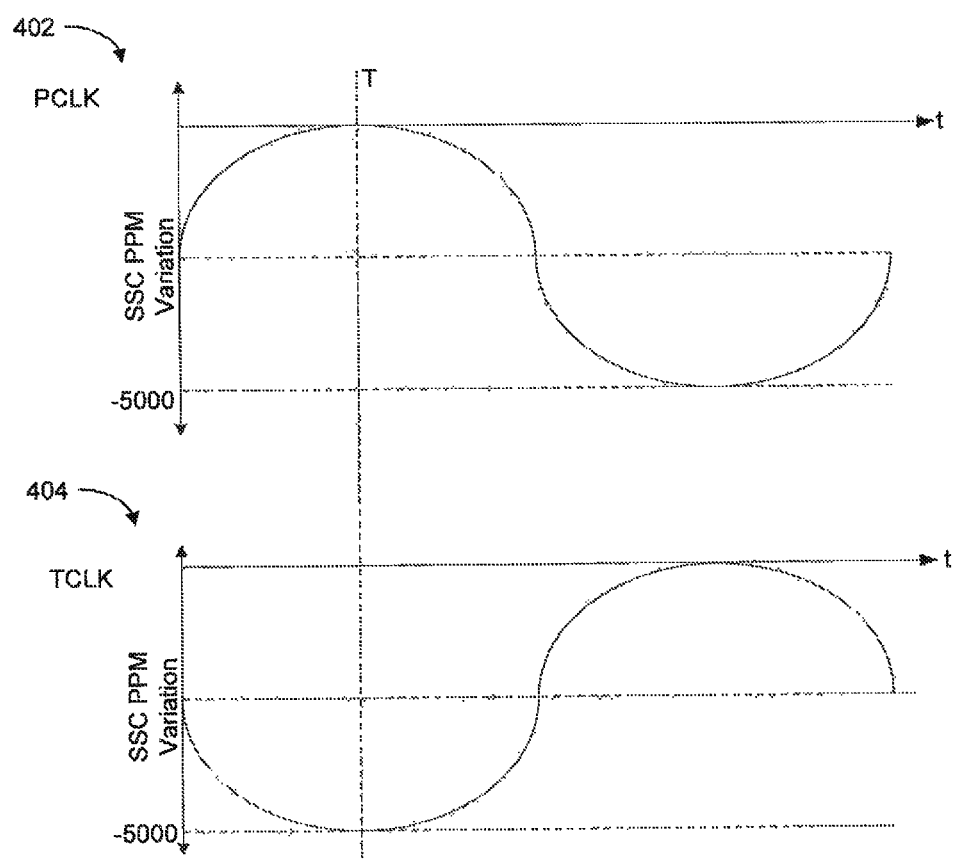
FIG. 4 is a graph of Spread Spectrum Clocking (SSC) PPM variations as a function of time for the PCLK and the TCLK.

FIG. 4 shows a chart 402 of an example SSC PPM variation of a PCLK relative to its associated reference clock, and a chart 404 of an example SSC PPM variation of a TCLK relative to its associated reference clock. In the example shown in FIG. 4, the PCLK and the TCLK have different reference clock signals In the example shown in FIG. 4, the SSC PPM variation between the two sets of clock signals is at its maximum at the time instance t=T, which is same as the time instance t=T of FIG. 3, and is equal to 5000 PPM.

The three sets of clock signals, the TCLK, the RCLK, and the PCLK, may all be SSC clock signals, non-SSC clock signals, or any other combination of SSC clock signals and non-SSC clock signals. The clock signals may also have same set or different sets of reference clock signals. When two sets of clock signals are SSC clock signals, the total PPM variation between the two sets of clock signals is a sum of static PPM variation and SSC PPM variation.

Figure 5:
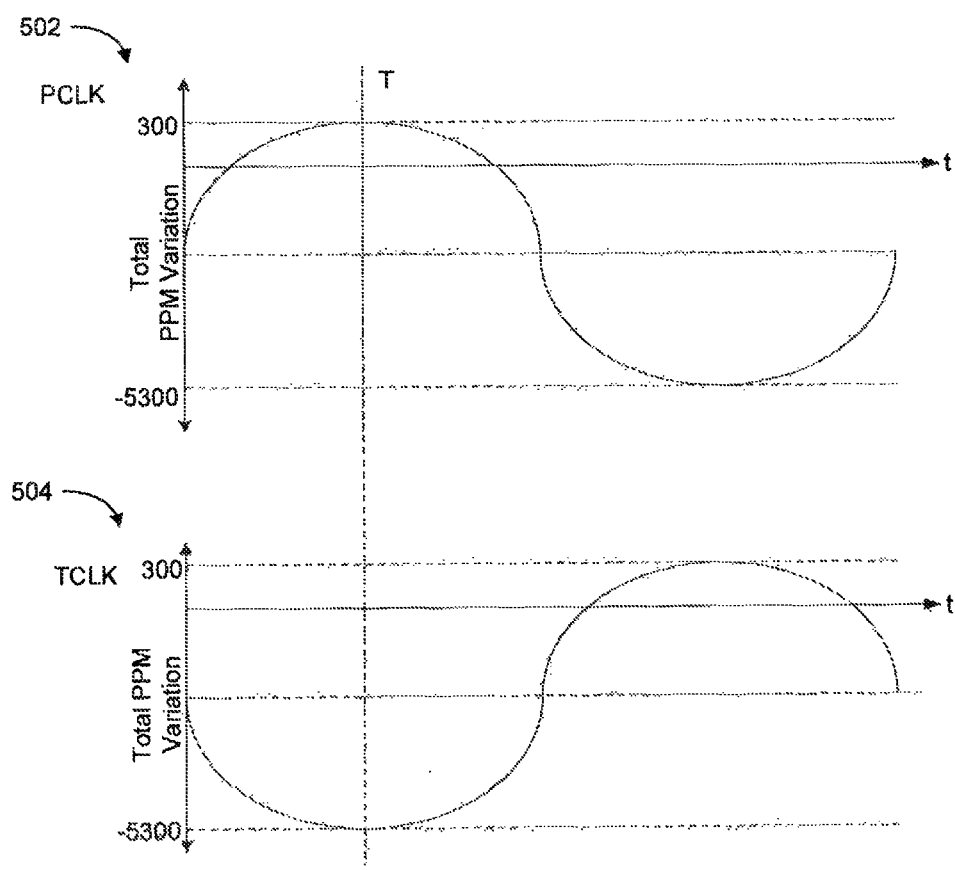
FIG. 5 is a graph of the total PPM variations between the PCLK and the TCLK as a function of time.

FIG. 5 shows a chart 502 of the total PPM variation between the PCLK and its associated reference clock, and a chart 504 showing the total PPM variation between the TCLK and its associated reference clock for the examples shown in FIGS. 3 and 4.

As shown in FIG. 5, at the time instance t=T, when the PPM variation between the two sets of clock signals is at its maximum, the PCLK has a PPM variation of +300 PPM due to a static PPM variation and the TCLK has a PPM variation −5300 PPM due to a static PPM variation of −300 PPM and a SSC PPM variation of −5000PPM. This results in a maximum total PPM variation between the two sets of clock signals 5600 PPM.

Figure 6:
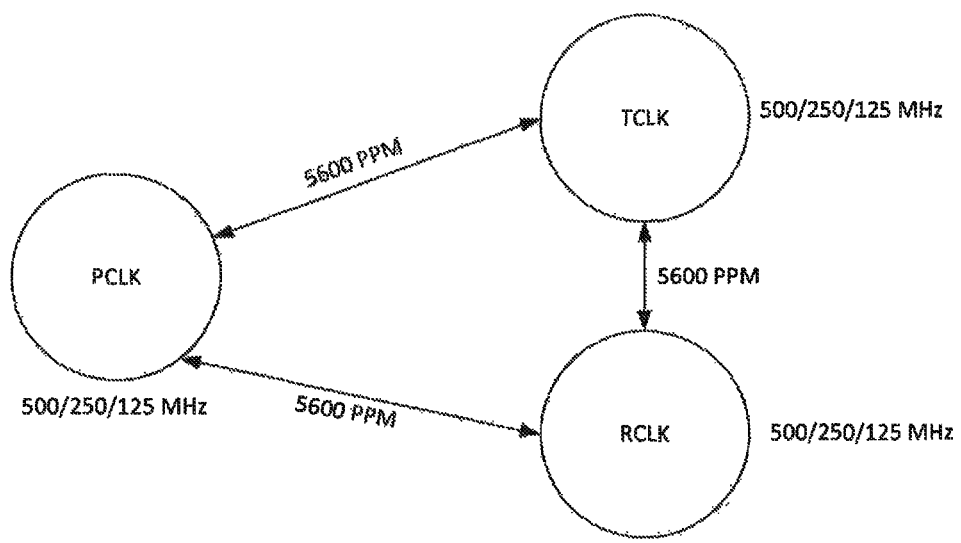
FIG. 6 is a block diagram of the maximum total PPM variation of 5600 PPM between the three clock signals the PCLK, the RCLK, and the TCLK.

FIG. 6 shows a block diagram illustrating the maximum total PPM variation of 5600 PPM between the three clock signals—the PCLK, the RCLK, and the TCLK.

The total PPM variation of 5600 PPM between the PCLK and the TCLK corresponds to a frequency difference of about 2.78 MHz. Thus, the MAC layer may write data to the PHY layer at a rate faster than a rate at which the PHY layer writes the data to the peripheral device. This may cause loss of data. Similarly, when the MAC layer writes data to the PHY layer at a rate slower than a rate at which the PHY layer writes the data to the peripheral device, the PHY layer may run out of data to write data to the peripheral device. As a result, the PHY layer may rewrite previously written data to the peripheral device. This may cause data corruption. One or more cross clock compensation methods are performed to prevent the data loss and the data corruption caused by the difference in the clock frequencies.

Figure 7:
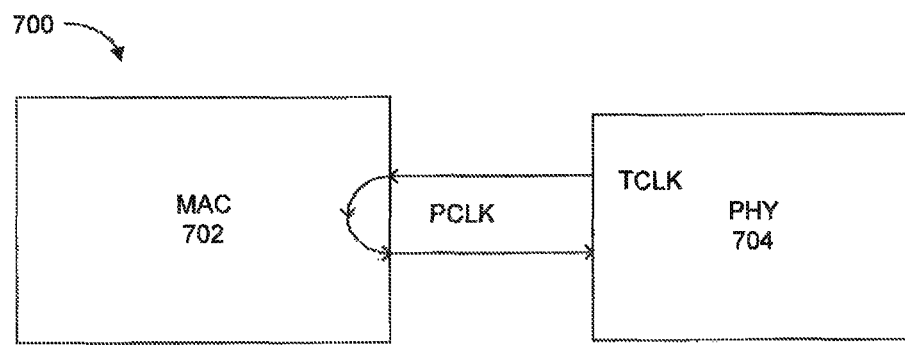
FIG. 7 is a block diagram of cross clock compensation between the TCLK and the PCLK in a PCIe bus according to the prior art.

FIG. 7 shows another example of a known architecture for a PCIe bus 700 having a MAC layer 702 and a PHY layer 704 that provides cross clock compensation between the TCLK and the PCLK. In the PCIe bus 700, the TCLK signal that is utilized for data transmitted by the PHY layer 704 to a peripheral device (not shown) is provided to the MAC layer 702. The TCLK signal at the MAC layer 702 is looped back to the PHY layer 704 such that the TCLK signal is utilized as the PCLK signal, i.e., the TCLK and the PCLK synchronous with each other. However, the looping of the clock between the MAC layer 702 and the PHY layer 704 does not make the TCLK and the PCLK perfectly synchronous with each other. In addition to the looping, the TCLK and the PCLK may be balanced to make the TCLK perfectly synchronous with the PCLK. The complexity involved in balancing the TCLK and the PCLK increases when a PCIe bus (also known as a port) is split into a plurality of smaller buses. The process of splitting the PCIe bus into a plurality of smaller buses is known as port bifurcation.

Figure 8:
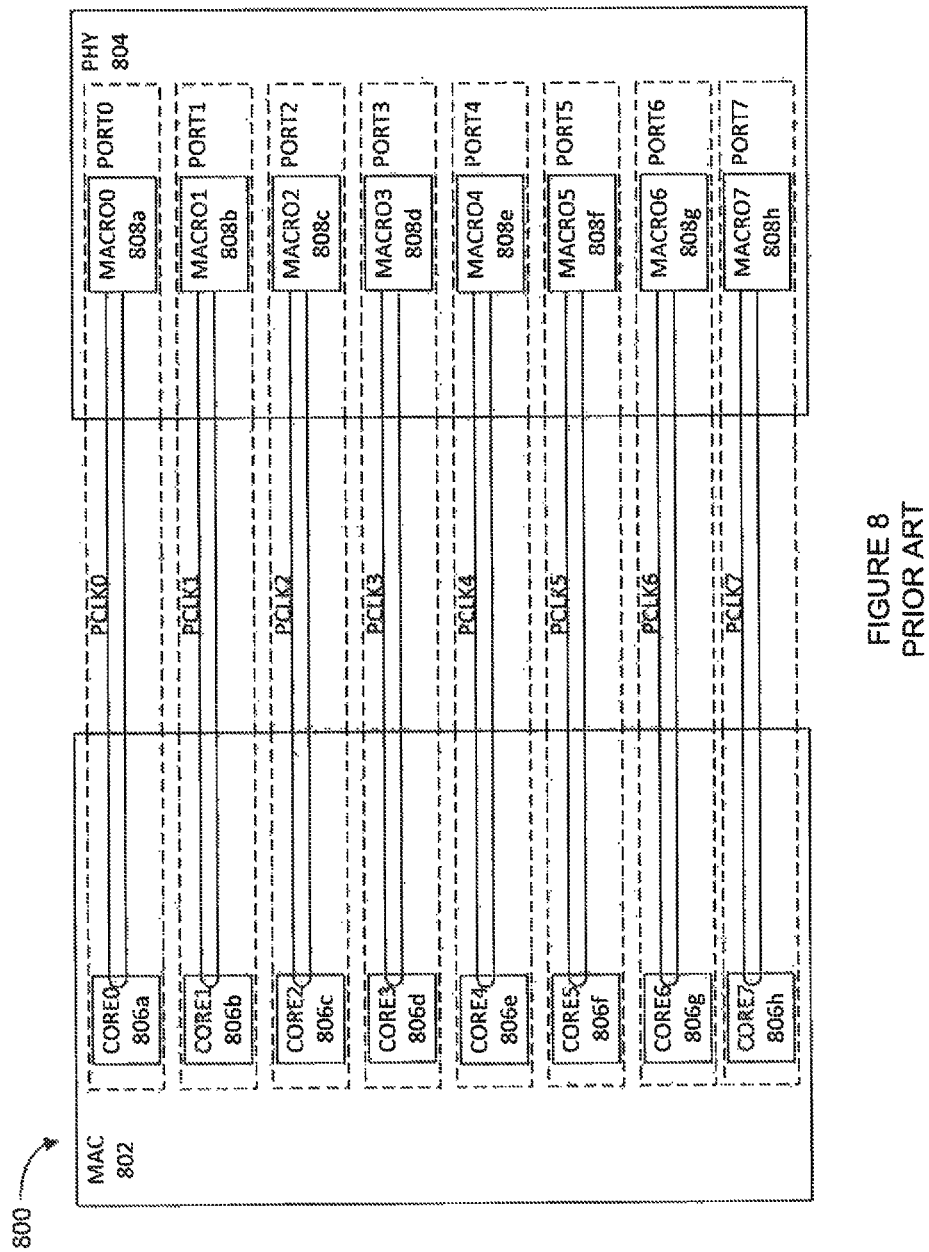
FIG. 8 is a block diagram of a bifurcated port of a PCIe bus according to the prior art.

FIG. 8 shows a block diagram of a known bifurcated PCIe bus 800 having multiple ports that each provide cross clock compensation by looping the TCLK at the MAC layer 802 to be utilized as the PCLK. As shown in FIG. 8, the MAC layer 802 is split into multiple MAC core instances 806a-806h and the PHY layer 804 is split into multiple PHY macro instances 808a-808h. The multiple MAC core instances 806a-806h are connected to corresponding PHY macro instances 808a-808h in the PHY layer 804 thus, forming a plurality of smaller ports. As the number of the MAC core instances 806a-806h and the PHY macro instances 808a-806h increases, the balancing of the looped clock signals becomes a significant challenge. For example, as the number of PHY macro instances and MAC core instances increases, the increased number of looped clock signals increases the number of clock tree balance points, making balancing the looped clocks more complex.

The present disclosure describes methods and systems for cross clock compensation between the MAC and the PHY layers in PCIe. The methods and systems of the present disclosure eliminate the need for complex design involving looping and balancing of the TCLK and the PCLK across the MAC core instances and the PHY macro instances.

The methods and systems of the present disclosure provide support for PCIe bifurcation without involving significant complexities of looping and balancing of clocks. The methods and systems of the present disclosure also facilitate utilizing smaller sized buffers compared to known PCIe buses and in some cases eliminating the need for elastic buffers.

The methods and systems of the present disclosure support various clocking schemes, such as separate reference clock signals with independent SSC (SRIS), SSC, common clocking scheme, and asynchronous clocking scheme. The methods and systems of the present disclosure also support different PHY macro instances operating on clock frequencies of different PCIe generations. In addition, the methods and systems of the present disclosure are applicable to sets of clock signals having any amount of PPM variations between them.

In an aspect of the present disclosure, the looping and the balancing between the TCLK and the PCLK is eliminated by decoupling the TCLK and the PCLK thus, making them asynchronous. By eliminating looping and balancing between TCLK and PCLK, the complexity of the PCIe bus, particularly in a PCIe bus having many bifurcated ports, is reduced compared to known PCIe buses that rely on looping and balancing.

Further, because the PCLK and the TCLK are decoupled, the frequencies of the TCLK and the PCLK may differ due to PPM variations and cause a rate at which data is written to the PHY layer by the MAC layer different from a rate at which data is written by the PHY layer to the peripheral device. This, in turn, may result in loss or corruption of data as explained earlier. To prevent the loss of data, in an example implementation of the present disclosure, one or more ports called backpressure ports may be provisioned in a MAC layer-PHY layer interface to control reading and writing of data by the MAC layer. Although the present disclosure is described with reference to controlling reading and writing of data by the MAC layer in the MAC layer-PHY layer interface, it will be understood that the present disclosure also covers controlling writing and reading of the data by the PHY layer in the MAC layer-PHY layer interface.

According to an aspect of the present disclosure, a Peripheral Component Interconnect express (PCIe) bus adapted for cross clock compensation of asynchronous clocks of the PCIe bus, the PCIe bus includes one or more physical (PHY) data ports provided in a PHY layer, the one or more PHY data ports for communicating with a peripheral device, the PHY layer having a transmit clock (TCLK) for timing transmission of data to the peripheral device and a receive clock (RCLK) for timing receiving data from the peripheral device, one or more media access control (MAC) ports provided in a MAC layer, the one or more MAC ports for communicating with the PHY layer, the MAC layer having an interface clock (PCLK) for timing transmission of data to the PHY layer and receiving of data from the PHY layer, wherein the PCLK and one or both of the TCLK and the RCLK are asynchronous, and one or more backpressure ports at an interface between the PHY layer and the MAC layer for controlling at least one of reading data and writing data by one of the PHY layer and the MAC layer.

In another aspect, the one or more backpressure ports control at least one of reading data and writing data by the MAC layer.

In another aspect, the one or more backpressure ports include a Rx_DATA_ENABLE port such tha,t when the Rx_DATA_ENABLE port is asserted, the MAC layer reads data from the PHY layer, and when the Rx_DATA_ENABLE port is de-asserted, the MAC layer does not read data from the PHY layer.

In another aspect, when a PCLK frequency is higher than a RCLK frequency, the Rx_DATA_ENABLE port is de-asserted periodically to compensate for the higher PCLK frequency.

In another aspect, the one or more backpressure ports include a Tx_DATA_ENABLE port such that, when the Tx_DATA_ENABLE port is asserted, the MAC layer writes data to the PHY layer, and when the Tx_DATA_ENABLE port is de-asserted, the MAC layer does not write data to the PHY layer.

In another aspect, when a PCLK frequency is higher than a TCLK frequency, the TX_DATA_ENABLE port is de-asserted periodically to compensate for the higher PCKL frequency.

In another aspect, the PHY layer includes one or more of a Tx elastic buffer for providing redundant data to the peripheral device to compensate for a PCLK frequency that is less than a TCLK frequency, and a Rx elastic buffer for storing data received from the peripheral until the MAC layer is ready to read to compensate for the PCLK frequency that is less than a RCLK frequency.

In another aspect, one or more of the PCLK, TCLK, and RCLK operate on spread spectrum clocking (SSC).

In another aspect, a PCLK frequency is set higher than both a maximum TCLK frequency and a maximum RCLK frequency.

In another aspect, the PHY layer does not include elastic buffers connected to the PHY data ports for compensating for differences between the PCLK and the TCLK and the RCLK.

In another aspect, the PHY layer includes a plurality of PHY macro instances, and the MAC layer includes a plurality of MAC core instances, wherein the backpressure ports are provided at an interface between each of the PHY macro instances of the PHY layer and one or more MAC core instances of the MAC layer.

According to another aspect of the present disclosure, method of controlling a Peripheral Component Interconnect express (PCIe) bus to provide cross clock compensation is disclosed, the PCIe bus having a physical (PHY) layer having one or more PHY data ports for communicating with a peripheral device, the PHY layer having a transmit clock (TCLK) for timing transmission of data to the peripheral device and a receive clock (RCLK) for timing receiving of data from the peripheral device, a media access control (MAC) layer having one or more MAC data ports for communicating with the PHY layer, the MAC layer having an interface clock (PCLK) for timing transmission of data to the PHY layer and receiving of data from the PHY layer, wherein the PCLK and one or both of the TCLK and the RCLK are asynchronous, and one or more backpressure ports at an interface between the PHY layer and the MAC layer for controlling at least one of reading data and writing data by one of the PHY layer and the MAC layer, the method includes signaling, via the one or more backpressure ports at the interface between the PHY layer and the MAC layer, one of the PHY layer and the MAC layer to activate, for a first time period, one of reading and writing by the one of the PHY layer and the MAC layer, and de-activate, for a second time period, one of reading or writing by the one of the PHY layer and the MAC layer, wherein the first time period and the second time period compensate for a difference between a PCLK frequency and either a TCLK frequency or a RCLK frequency.

In another aspect, the method includes setting the PCLK frequency greater than the maximum TCLK frequency and the maximum RCLK frequency.

In another aspect, signaling comprises signaling the MAC layer to activate or de-activate one of reading from and writing to the PHY layer.

In another aspect, in a burst mode, signaling includes signaling the MAC layer, via a Tx_DATA_ENABLE backpressure port, to activate writing of data to a buffer of the PHY layer when the buffer meets or is less than a first fill threshold, and signaling the MAC layer, via the Tx_DATA_ENABLE backpressure port, to de-activate writing of data to the buffer of the PHY layer when the buffer meets or exceeds a second fill threshold that is greater than the first fill threshold.

In another aspect, in a burst mode, signaling includes signaling the MAC layer, via a Rx_DATA_ENABLE backpressure port, to activate reading of data from a buffer of the PHY layer when the buffer meets or is less than a third fill threshold, and signaling the MAC layer, via the Rx_DATA_ENABLE backpressure port, to de-activate reading of data from the buffer of the PHY layer when the buffer meets or exceeds a fourth fill threshold that is less than the third fill threshold.

In another aspect, the method includes, in a fixed mode, determining a difference between the PCLK frequency and the TCLK frequency, and wherein signaling includes signaling the MAC layer, via a Tx_DATA_ENABLE backpressure port, to activate writing of data to a buffer of the PHY layer, and periodically signaling the MAC layer at a first time interval, via the Tx_DATA_ENABLE backpressure port, to de-activate writing of data to the buffer of the PHY layer for a first period, wherein the first time interval between de-activating writing of data and the first period are determined based on the difference between the PCLK frequency and the TCLK frequency to rate match the PCLK frequency to the TCLK frequency.

In another aspect, the method includes determining the first time interval between de-activating writing of data and the first period based on the generation of the PCIe standard utilized by the PCIe bus.

In another aspect the method includes, in a fixed mode determining a difference between the PCLK frequency and the RCLK frequency, and wherein signaling includes signaling the MAC layer, via a Rx_DATA_ENABLE backpressure port, to activate reading of data from a buffer of the PHY layer, and periodically signaling the MAC layer at a second time interval, via the Rx_DATA_ENABLE backpressure port, to de-activate reading of data from the buffer of the PHY layer for a second period, wherein the second time interval between de-activating writing of data and the second period are determined based on the difference between the PCLK frequency and the RCLK frequency to match the rate of the PCLK frequency to the RCLK frequency.

In another aspect, the method includes determining the second time interval between de-activating reading of data and the second period based on the generation of the PCIe standard utilized by the PCIe bus.

Figure 9:
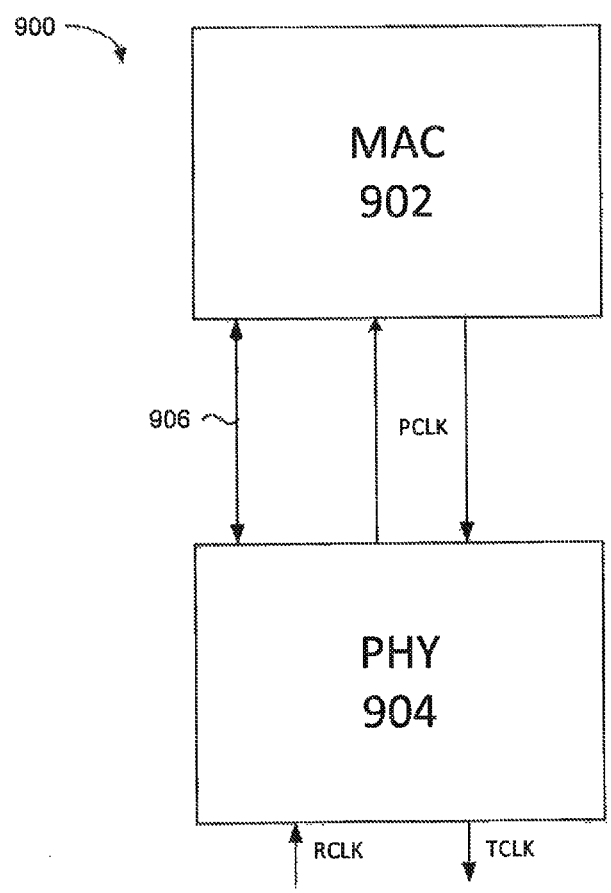
FIG. 9 is a block diagram of a PCIe bus that includes backpressure ports in the MAC layer-PHY layer interface in accordance with another aspect of the present disclosure.

FIG. 9 is a block diagram an example PCIe bus 900 that includes a MAC layer 902 and a PHY layer 904. The PCIe bus 900 also includes one or more backpressure ports 906 at an interface between the MAC layer 902 and the PHY layer 904. The one or more backpressure ports 906 may include, for example, a Tx_DATA_ENABLE port. The Tx_DATA_ENABLE port indicates when the PHY layer 904 is ready to accept data transmitted by the MAC layer 902. In other words, when the Tx_DATA_ENABLE port is asserted, the MAC layer 902 may be enabled to transmit data to the PHY layer 904 and when the Tx_DATA_ENABLE port is de-asserted, the MAC layer 902 may be disabled from transmitting data to the PHY layer 904. When the frequency of the PCLK is higher than the frequency of the TCLK, the PHY layer 904 may de-assert the Tx_DATA_ENABLE port for a period of time to disable transmission of data from the MAC layer 902 such that the frequency different between the PCLK and TCLK may be compensated for. When Tx_DATA_ENABLE port is de-asserted, the MAC layer 902 stops transmitting data to the PHY layer 904 thus, preventing data loss caused by the MAC layer 902 transmitting data to the PHY layer 904 faster than the PHY layer 904 transmits data to a peripheral device (not shown).

Alternatively, or additionally, one or more backpressure ports 906 may include, for example, an Rx_DATA_ENABLE port to indicate when the PHY layer 904 is ready to transmit data to the MAC layer 902. In other words, when the Rx_DATA_ENABLE port is asserted, the MAC layer 902 may be enabled to receive data from the PHY layer 904 and when the Rx_DATA_ENABLE port is de-asserted, the MAC layer 902 may be disabled from receiving data from the PHY layer 904. When the frequency of the PCLK is higher than the frequency of the RCLK, the PHY layer 904 is receiving data from a peripheral device slower than the PHY layer 904 is transmitting data to the MAC layer 902. Thus, the PHY layer 904 may de-assert the Rx_DATA_ENABLE port for a period of time to indicate to the MAC layer 902 that the PHY layer 904 is not ready to transmit further data to the MAC layer 902, compensating for the difference between the PCLK and the RCLK. In an example implementation, when the Rx_DATA_ENABLE port is de-asserted, the PHY layer 904 may retransmit previously transmitted data to the MAC layer 902 which the MAC layer 902 may ignore thus, preventing data corruption.

Thus, with the use of the Tx_DATA_ENABLE port and the Rx_DATA_ENABLE port, the PHY layer 904 controls when the MAC layer 902 writes data to and reads data from the PHY layer 904 in order to prevents data loss or corruption due to higher frequency of the PCLK relative to the frequency of the TCLK and the frequency of the RCLK.

When the PHY layer 906 is not compensating for frequency differences between the PCLK and one or more of the TCLK and the RCLK, the backpressure ports 906 may be always asserted to indicate that the PHY layer 904 is always ready to communicate with the MAC layer 902.

When the frequency of the PCLK is less than the frequency of either of the TCLK or the RCLK, or both, one or more elastic buffers may be included in a PHY layer to prevent data corruption or data loss.

Figure 10:
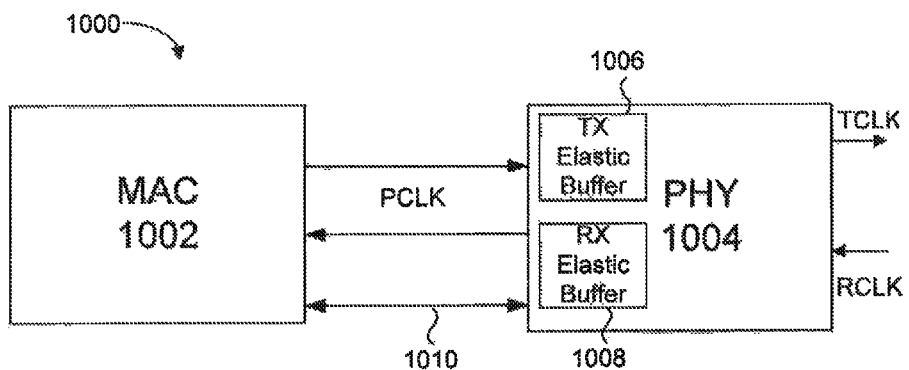
FIG. 10 is a block diagram of a PCIe bus that includes a transmit (Tx) elastic buffer and a receive (Rx) elastic buffer in the PHY layer in accordance with another aspect of the present disclosure.

FIG. 10 is a block diagram of a PCIe bus 1000 having a MAC layer 1002 and a PHY layer 1004. In the PCIe bus 1000, the PHY layer 1004 includes a Tx elastic buffer 1006 and a Rx elastic buffer 1008. When the frequency of the PCLK is less than the frequency of the TCLK, the PHY layer 1004 writes data to the peripheral device (not shown) at the TCLK rate, which is faster than the PCLK rate at which the MAC layer 1002 writes data to the PHY layer 1004. In such a case, the Tx elastic buffer 1006 may be used to provide redundant data, known as SKIP ordered sets, to the peripheral device to allow the data from the MAC layer 1002 to "catch up" in order to prevent corruption of data transmitted to the peripheral device. The SKIP ordered sets are redundant data bytes, defined by the PCIe protocol, periodically received at the Tx elastic buffer 1006 from the MAC layer 1002.

Similarly, when the frequency of the PCLK is less than the frequency of the RCLK, the PHY layer 1004 reads data from the peripheral device at the RCLK rate, which is faster than the PCLK rate at which the MAC layer 1002 reads data from the PHY layer 1004. In such a case, the Rx elastic buffer 1008 may be used to store data from the peripheral device until the MAC layer 1002 is ready to read the data. In addition to sending actual data, the peripheral device may also send the SKIP ordered sets to the Rx elastic buffer 1008. When the MAC layer 1002 reads the data from the Rx elastic buffer 1008, the MAC layer 1002 may ignore the SKIP ordered sets written by the peripheral device. In this way, the RX elastic buffer 1008 compensates for a RCLK frequency that is higher than the PCLK frequency.

In an aspect of the present disclosure, the frequency of the PCLK may be made, or set, higher than the frequency of one or both of the TCLK and the RCLK. The PCLK may, for example, be set to a frequency that always higher than both of the TCLK frequency and the RCLK frequency, taking into account of the maximum possible PPM variation of the TCLK and RCLK relative to the PCLK.

Figure 11:
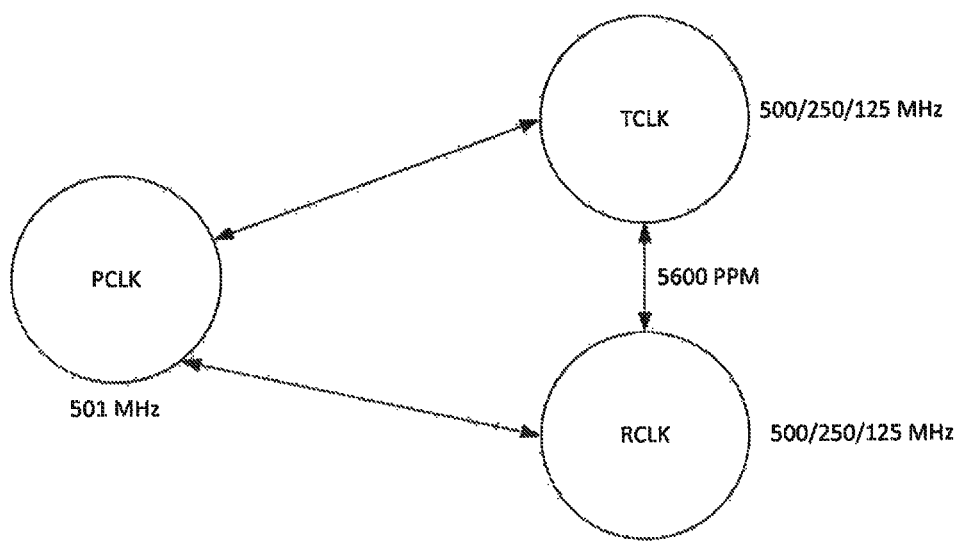
FIG. 11 is a block diagram of a PCLK having a higher frequency than the frequencies of the TCLK and the RCLK in accordance with another aspect of the present disclosure.

FIG. 11 is a block diagram illustrating an example in which the PCLK frequency is set to be higher than both of the frequencies of the TCLK and the RCLK. The differences in the frequency of the PCLK and the frequencies of the TCLK and the RCLK may be determined based on maximum total PPM variations of the sets of clock signals as determined by the PCIe generation utilized by the TCLK and the RCLK. For example, when the TCLK and PCLK are SSC clock signals, the maximum total PPM variation between the TCLK and PCLK may be 5600 PPM, as explained earlier. For a TCLK or RCLK frequency of 500 MHz, a 5600 PPM variation corresponds to a frequency difference of about 2.78 MHz. Thus, when the TCLK or RCLK, or both, is SSC and has a frequency of 500 MHz, setting the PCLK frequency to a frequency greater than 502.78 MHz, for example, 505 MHz, will ensure that the PCLK frequency is always higher than the maximum TCLK or RCLK frequency, taking into account the maximum total PPM variation.

Similarly, when the TCLK or RCLK and the PCLK are both non-SSC clock signals, they may have a maximum total PPM variation of 600 PPM due to static PPM variation. For a TCLK or RCLK frequency of 500MHz, 600 PPM corresponds to a maximum frequency difference of about 0.30 MHz. Thus, when the TCLK or RCLK, or both, is non-SCC and has a frequency of 500 MHz, setting the PCLK to a frequency greater than 500.3 MHz, for example, 501 MHz as shown in FIG. 11, will ensure that the PCLK frequency is always greater than the maximum TCLK or RCLK frequency, taking into account the maximum total PPM difference.

Although the present example is explained with respect to a clock frequency of 500 MHz, it may be understood that the methods and systems of the present disclosure may be used for any clock frequency. Although the present example is explained with respect to PPM variations of 600 PPM and 5600 PPM, it may be understood that the methods and systems of the present disclosure may be used for any amount of PPM variations by determining a PCLK frequency that is suitably higher than either the RCLK or TCLK frequencies. Thus, the present disclosure provides a highly versatile system that can be used for any clock frequency and any PPM variation.

When the frequency of the PCLK frequency of a PCIe bus is set to be greater than the maximum frequency of the TCLK, one or more Tx first in first out (Tx_FIFO) buffer instances may be provided in a PHY layer to store data written by the MAC layer to the PHY layer until the PHY layer is ready to write the data to the peripheral device. Additionally, or alternatively, when the frequency of the PCLK frequency is set to be greater than the maximum frequency of the RCLK, one or more Rx first in first out (Rx_FIFO) buffer instances may be provided in the PHY layer to store data read from the peripheral device when the Rx_DATA_ENABLE port is de-asserted and the MAC layer cannot read data from the PHY layer.

Because, in the example in which the frequency of the PCLK is greater than the maximum frequency of the TCLK and the RCLK, an increase in frequencies of the TCLK and the RCLK due to the PPM variations cannot cause the TCLK or RCLK frequency to increase greater than the PCLK frequency. Because the PCLK frequency is always greater than the TCLK frequency and RCLK frequency, data is always being read by the MAC layer faster than data is received from the peripheral device, and data is transmitted to the PHY layer faster than the PHY layer transmits the data to the peripheral device, which reduces the possibility that data loss and data corruption will occur during communication between the PCIe bus and the peripheral device.

Figure 12:
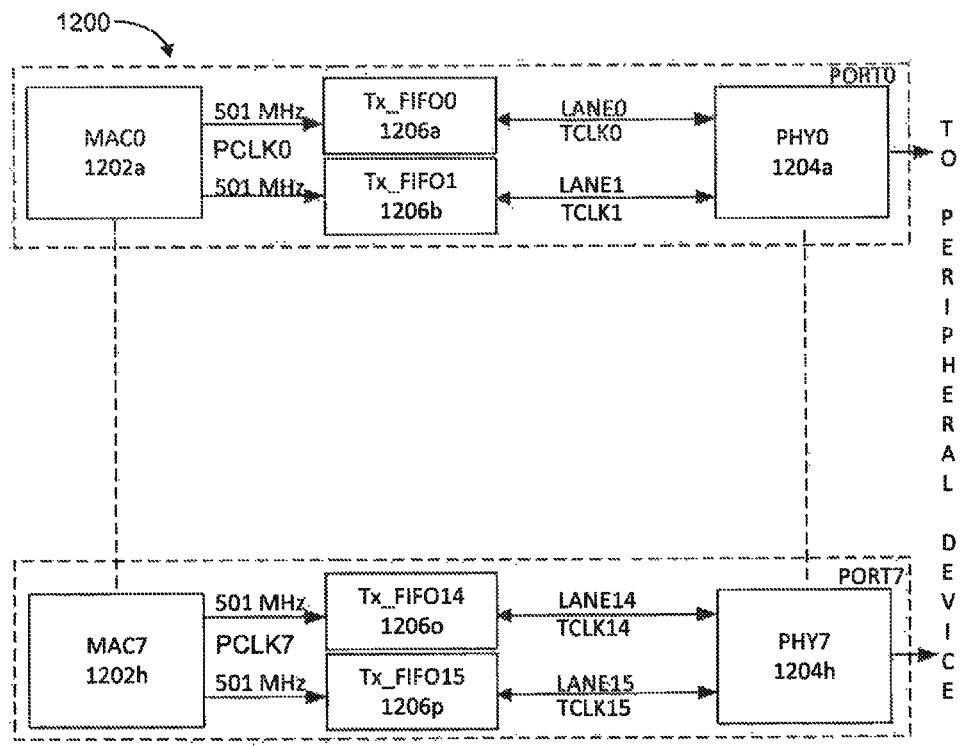
FIG. 12 is a block diagram of a PCIe bus having bifurcated ports in accordance with an aspect of the present disclosure.

FIG. 12 is a block diagram that shows a writing operation in a PCIe bus 1200 from the MAC layer to the PHY layer when the PCLK has a frequency of 501 MHz. In the example shown in FIG. 12, the PCIe bus 1200 is bifurcated to form 8 ports: PORT0, . . . , PORT7. Each port includes a MAC core instance 1202a-1202h and a PHY macro instance 1204a-1204h. Each port also includes two lanes LANE0, LANE1. . . LANE14, LANE15 and two Tx_FIFO buffer instances 1206a-1206p, one buffer per lane. Here, the Tx_FIFO buffer instances 1206a-1206p are shown outside their corresponding PHY macro instances 1204a-1204h for the sake of clarity. However, it will be understood that the Tx_FIFO buffer instances 1206a-1206p may be provided within their corresponding PHY macro instances 1204a-1204h.

Data is first written by a MAC core instance 1202a-1202h to a corresponding Tx_FIFO buffer instance 1206a-1206p at a frequency of 501 MHz, corresponding to the PCLK frequency, when the backpressure ports (not shown) are asserted. In this example shown in FIG. 12, the each backpressure port includes a Tx_DATA_ENABLE port. In the bifurcated PCIe bus 1200 shown in FIG. 12, each of the lanes LANE0, LANE1. . . LANE14, LANE15 has an associated backpressure port.

The data written to the Tx_FIFO buffer instance 1206a-1206p is written by a corresponding PHY macro instance 1204a-1204h to the peripheral device (not shown) at a frequency TCLK, which may be 500 MHz, 250 MHz, or 125 MHz depending on PCIe generation of the PCIe bus 1200.

Because the PCLK frequency is set to be always higher than a maximum TCLK frequency, a fill level, i.e., a level up to which data is filled, of the Tx_FIFO buffer instance 1206a-1206p increases when the Tx_DATA_ENABLE port is asserted. To prevent the Tx_FIFO buffer instance 1206a-1206p from overflowing, the Tx_DATA_ENABLE port may be de-asserted for the Tx_FIFO buffer instance 1206a-1206p for a period of time such that the fill level of the Tx_FIFO 1206a-1206p is reduced. The assertion and de-assertion of the Tx_DATA_ENABLE port is performed by a FIFO controller logic (not shown).

The FIFO controller logic may determine when to assert and de-assert the Tx_DATA_ENABLE port for the Tx_FIFO buffer instance 1206a-1206p based on a particular mode of operation of the PCIe bus 1200. The modes may include, for example, a "burst mode" and a "fixed mode".

In the burst mode, the Tx_DATA_ENABLE port is de-asserted when Tx_FIFO buffer instance 1206a-1206p reaches a maximum fill level. The maximum fill level may be a total size of the Tx_FIFO buffer instance 1206a-1206p. When the fill level of the Tx_FIFO buffer instance 1206a-1206p decreases to an acceptable fill level, the Tx_DATA_ENABLE port may be asserted again. The acceptable fill level may be a zero fill level, i.e., when the Tx_FIFO buffer instance 1206a-1206p is empty. The maximum fill level may be indicated by a FIFO_FULL marker. A FIFO_EMPTY marker may indicate when the Tx_FIFO buffer instance 1206a-1206p reaches a minimum fill level. In an example, the FIFO_EMPTY marker is made high when the Tx_FIFO buffer instance 1206a-1206p has 4 memory blocks in it, i.e., when the fill level of the Tx_FIFO buffer instance 1206a-1206p is 4.

Figure 13:
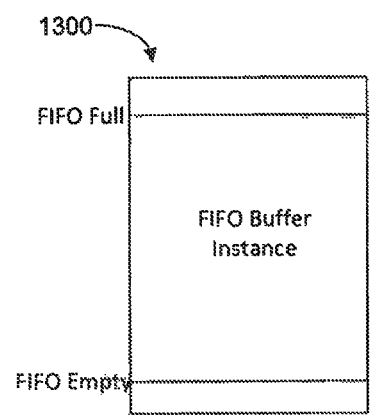
FIG. 13 is a block diagram of a Tx_FIFO buffer instance in accordance with another aspect of the present disclosure.

FIG. 13 is a block diagram of an example Tx_FIFO buffer instance 1300 having a FIFO_FULL marker and a FIFO_EMPTY marker. The FIFO_FULL marker and the FIFO_EMPTY marker may be configurable to change the fill level markers of the Tx_FIFO buffer instance 1300 that are utilized in the burst mode as described above.

The FIFO_FULL and the FIFO_EMPTY markers may be made high or low based on values of a write pointer WR_PTR which is incremented each time data is written to the Tx_FIFO buffer instance 1206a-1206p and a read pointer RD_PTR which is incremented each time data is read from the Tx_FIFO buffer instance 1206a-1206p. The fill level of the Tx_FIFO buffer instance 1206a-1206p may be determined as the difference in values of the WR_PTR and the RD_PTR. Therefore, when the difference between the values of the WR_PTR and the RD_PTR increases beyond a threshold value corresponding to the maximum fill level, the FIFO_FULL marker may be made high. Similarly, when the difference between the values of the WR_PTR and the RD_PTR decreases below a threshold value corresponding to the minimum fill level, the FIFO_EMPTY marker is made high. The WR_PTR may be incremented by 1 during each clock signal of the PCLK when the Tx-_DATA_ENABLE port is asserted. Similarly, the RD_PTR may be incremented by 1 during each clock signal of the TCLK.

In the fixed mode, the Tx_DATA_ENABLE port is de-asserted based on the PCIe generation of the TCLK to provide a matching between rates at which data is written to the Tx_FIFO buffer instance 1206a-1206p from the corresponding MAC core instance 1202a, 1202b, which is determined by the PCLK, and the rate at which data is written from the Tx_FIFO buffer instance 1206a-1206p to the peripheral device, which is determined by TCLK. For example, when the TCLK is a Gen1 clock (i.e., TCLK frequency is 125 MHz), the frequency of the PCLK at 501 MHz is roughly four times the frequency of the TCLK. Thus, the Tx_DATA_ENABLE port is de-asserted three times in every four clock signals of the PCLK. Similarly, when the TCLK is a Gen2 clock (i.e., TCLK frequency is 250 MHz) the Tx-_DATA_ENABLE port is de-asserted once in two clock signals of the PCLK. The method of matching between the rates at which data is written to the Tx_FIFO buffer instance 1206a-1206p from the MAC core instance 1202a, 1202b and data is written from the Tx_FIFO buffer instance 1206a-1206p to the peripheral device by the PHY macro instance 1204a, 1204b is hereinafter referred to as rate matching.

Utilizing a backpressure Tx_DATA_ENABLE port facilitates the Tx_FIFO buffer instance 1206a-1206p never running out of data to transmit and, thus, the use of SKIP ordered sets for rate matching may be avoided. Avoiding SKIP ordered sets decreases latency and increases throughput compared to MAC-PHY buses that rely on SKIP ordered sets to perform rate matching.

Figure 14:
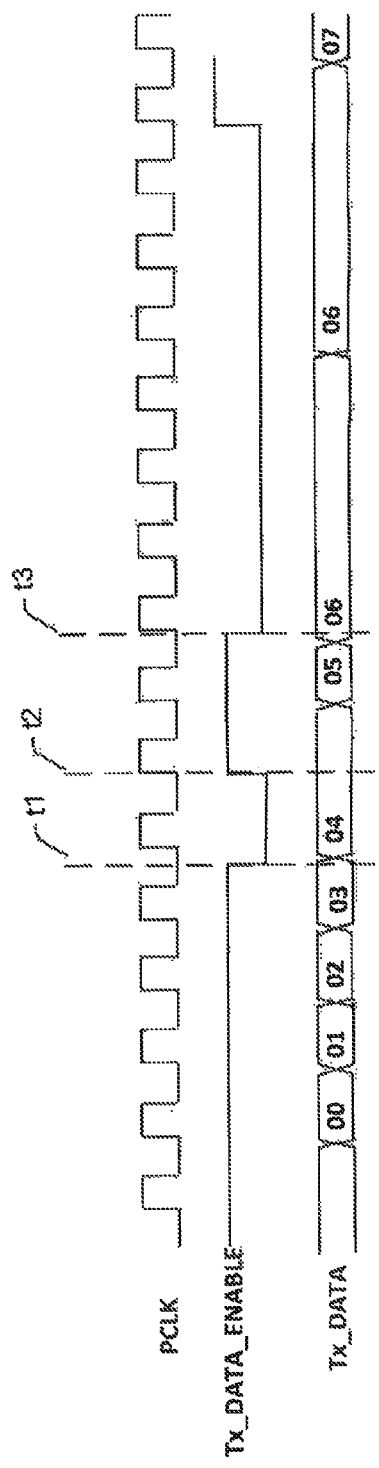
FIG. 14 is a timing diagram illustrating asserting and de-asserting a Tx-_DATA_ENABLE port in a burst mode to control writing Tx_DATA to the Tx_FIFO buffer instance in accordance with another aspect of the present disclosure.

FIG. 14 is a timing diagram illustrating asserting and de-asserting the Tx-_DATA_ENABLE port in an example burst mode to control writing Tx_DATA to a Tx_FIFO buffer instance by a MAC core instance. In the example shown in FIG. 14, the Tx_FIFO buffer instance reaches the maximum fill level at a time t1 and the Tx_DATA_ENABLE port is de-asserted by, for example, a FIFO control.

The Tx_DATA_ENABLE port remains de-asserted until a second time t2. During an interval of time between times t1 and t2, the Tx_DATA is written from the Tx_FIFO buffer instance to a peripheral device by a PHY macro instance at the frequency of TCLK. If, for example, the TCLK is Gen1, the Tx_DATA is written to the peripheral device at a TCLK frequency of 125 MHz. The numbers 00, 01, etc. of Tx-DATA represent units of data transmitted. Because the Tx_FIFO buffer instance does not receive the Tx_DATA from the MAC core instance and only writes the Tx_DATA to the peripheral device during the time interval from t1 to t2, the fill level of the Tx_FIFO buffer instance decreases. At time t2, when the Tx_FIFO buffer instance reaches the acceptable fill level due to decrease in the fill level, the Tx_DATA_ENABLE port is asserted again. Thereafter, the Tx_DATA_ENABLE port remains asserted until a time t3, when the Tx_FIFO buffer instance again reaches the maximum fill level and the Tx_DATA_ENABLE port is again de-asserted.

Figure 15:
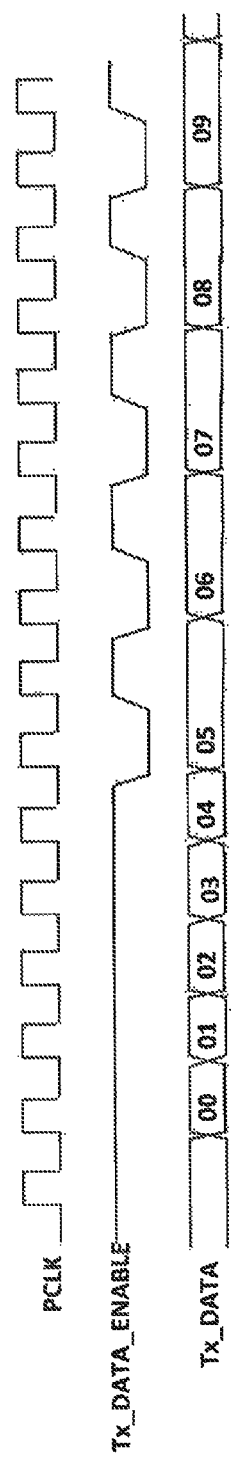
FIG. 15 is a timing diagram illustrating asserting and de-asserting a Tx-_DATA_ENABLE port in a burst mode to control writing Tx_DATA to the Tx_FIFO buffer instance in accordance with another aspect of the present disclosure.

FIG. 15 is a timing diagram asserting and de-asserting the Tx-_DATA_ENABLE port in the burst mode to control writing Tx_DATA to the Tx_FIFO buffer instance by the MAC core instance when the TCLK is a Gen2 clock (i.e. TCLK frequency is 250 MHz). As shown in FIG. 15, the Tx_DATA_ENABLE port is asserted and de-asserted based on the fill level of the Tx_FIFO buffer instance at different times compared to the Gen1 example illustrated in FIG. 14.

Figure 16:
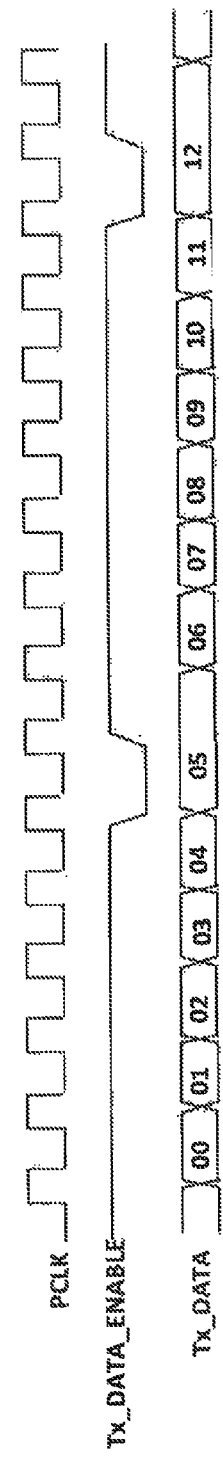
FIG. 16 is a timing diagram illustrating asserting and de-asserting a Tx-_DATA_ENABLE port in a burst mode to control writing Tx_DATA to the Tx_FIFO buffer instance in accordance with another aspect of the present disclosure.

FIG. 16 is a timing diagram asserting and de-asserting the Tx-_DATA_ENABLE port in the burst mode to control writing the Tx_DATA to the Tx_FIFO buffer instance by the MAC core instance when the TCLK is a Gen3 clock. It may be noted that the Tx_DATA_ENABLE port is asserted for longer periods of time compared to that of FIG. 14 and FIG. 15. This is due to the higher frequency of the TCLK of FIG. 16 (500 MHz) compared to the frequency of the TCLK of FIGS. 14 (125 MHz) and 15 (250 MHz). Because the frequency of the TCLK of FIG. 16 is higher compared to the frequency of the TCLK of FIGS. 14 and 15, the Tx_DATA is written to the PHY macro instance at a frequency faster than the frequency of FIGS. 14 and 15. Therefore, the Tx_FIFO buffer instance reaches the maximum fill level later than it does in FIGS. 14 and 15 and thus, asserts the Tx_DATA_ENABLE port for longer periods of time.

Figure 17:
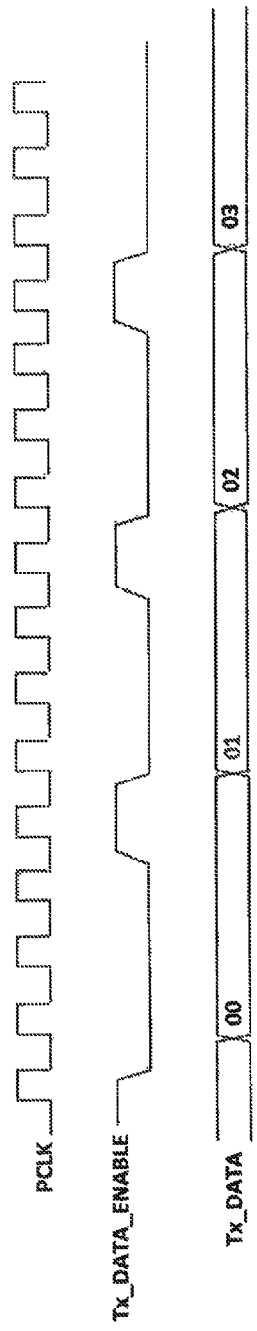
FIG. 17 is a timing diagram illustrating asserting and de-asserting a Tx-_DATA_ENABLE port in a fixed mode to control writing Tx_DATA to the Tx_FIFO buffer instance in accordance with an aspect of the present disclosure.

FIG. 17 is a timing diagram asserting and de-asserting the Tx-_DATA_ENABLE port in the fixed mode to control writing the Tx_DATA to the Tx_FIFO buffer instance by the MAC core instance when the TCLK is the Gen1 clock. The numbers 00, 01, etc. of Tx-DATA represent units of data transmitted. As shown in FIG. 17, the Tx_DATA_ENABLE port is asserted, and data is written from the MAC core instance to the Tx_FIFO, once in four cycles of the PCLK. In other words, the Tx_DATA_ENABLE port is de-asserted three out of four cycles of the PCLK as the frequency of the PCLK is almost four times the frequency of the TCLK. Thus, a rate matching between the PCLK and the TCLK is achieved.

Figure 18:
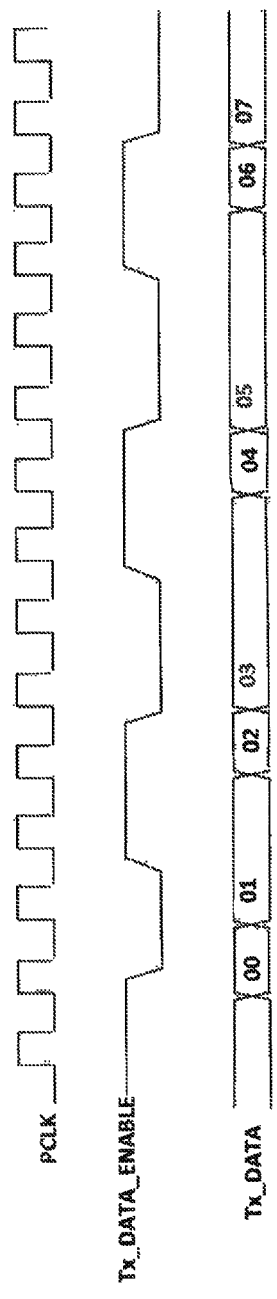
FIG. 18 is a timing diagram illustrating asserting and de-asserting a Tx-_DATA_ENABLE port in a fixed mode to control writing Tx_DATA to the Tx_FIFO buffer instance in accordance with another aspect of the present disclosure.

FIG. 18 is a timing diagram asserting and de-asserting the Tx-_DATA_ENABLE port in the fixed mode to control writing the Tx_DATA to the Tx_FIFO buffer instance by the MAC core instance when the TCLK is the Gen2 clock. As shown in FIG. 18, the Tx_DATA_ENABLE port is asserted, and data is written from the MAC core instance to the Tx_FIFO, once in two cycles of the PCLK. In other words, the Tx_DATA_ENABLE port is de-asserted two out of four cycles of the PCLK as the frequency of the PCLK is almost twice the frequency of the TCLK.

Because the Tx_DATA_ENABLE port is de-asserted periodically in the fixed mode, the Tx_FIFO buffer instance stores a limited amount of data at any given time. This enables limiting the Tx_FIFO buffer instance size to the amount of data written to the TX_FIFO during the period in which the Tx_DATA_ENABLE port is asserted. Also, because rate matching facilitates the Tx_DATA being received, over time, at the Tx_FIFO buffer instance at approximately the same frequency as the frequency of the TCLK, the latency of the Tx_DATA sent to the PHY macro instance is reduced.

The assertion and de-assertion of the Tx_DATA_ENABLE port to control writing data from the MAC layer to the PHY layer is explained in greater detail with reference to FIG. 19.

Figure 19:
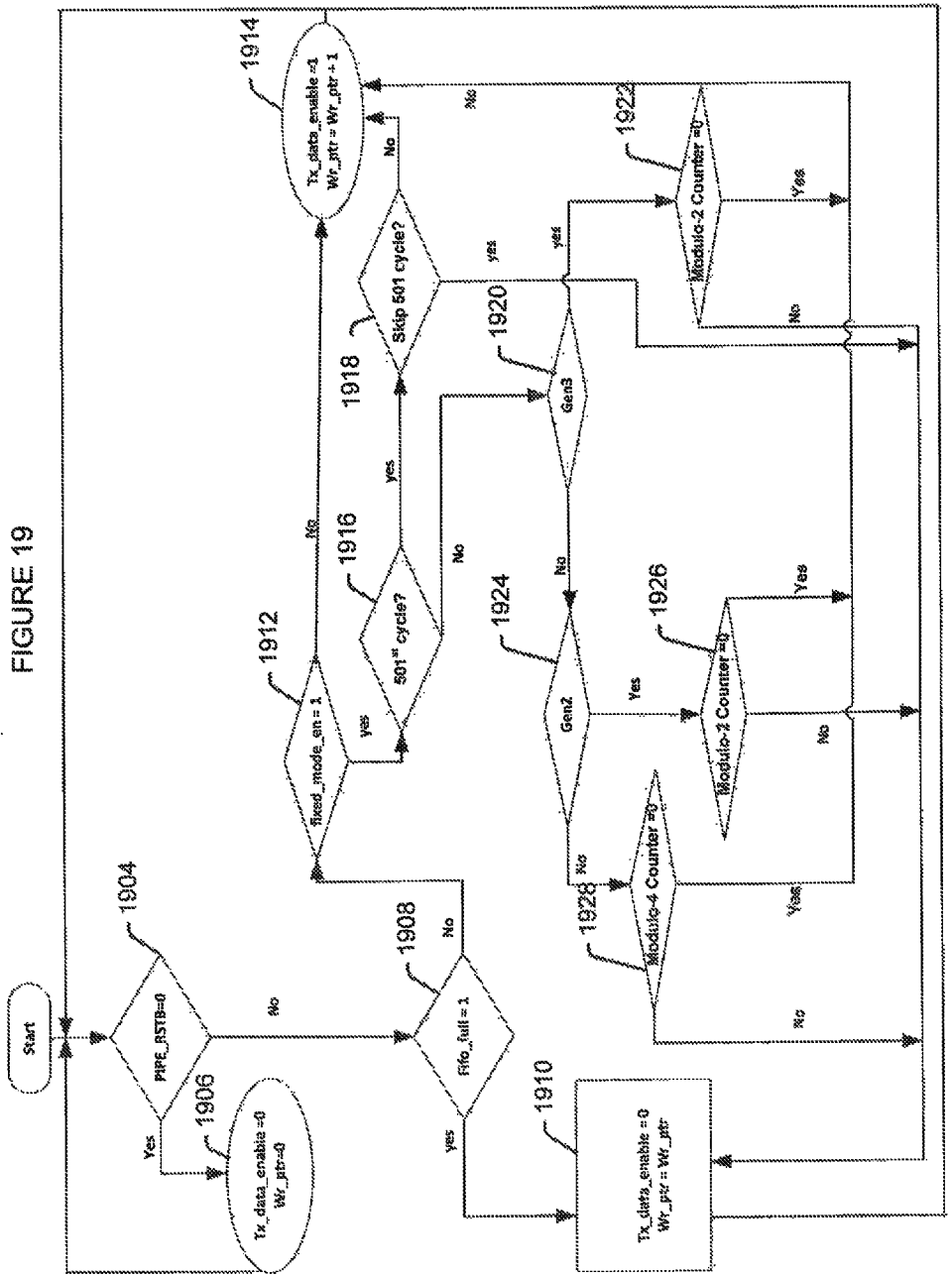
FIG. 19 is a flow chart of a method for controlling a Tx_DATA_ENABLE port in accordance with an aspect of the present disclosure.

FIG. 19 is a flow chart of a method for determining when to assert the Tx_DATA_ENABLE port for the Tx_FIFO buffer instance in the burst mode and the fixed mode for different PCIe generations of the TCLK. The method shown in FIG. 19 may be implemented by, for example, a FIFO controller logic included within the PCIe bus 1200 shown in FIG. 12.

At 1904, a status of a signal PIPE reset signal PIPE_RSTB is checked. The signal PIPE reset signal indicates whether a device, such as for example the device in which the FIFO controller logic is running, is in a reset mode.

When PIPE_RSTB is determined reset at 1904, indicating that the device in in the reset mode, the process moves to 1906 and the Tx_DATA-ENABLE port is de-asserted and the WR_PTR is reset. When the PIPE_RSTB signal is determined set at 1904, the FIFO controller logic proceeds to 1908, where a value of the FIFO_FULL marker is checked. When the value of the FIFO_full marker is 1, indicating that the Tx_FIFO buffer instance has reached the maximum fill value, at 1910, a decision is made to keep the Tx_DATA_ENABLE port de-asserted as more data cannot be written to the Tx_FIFO buffer instance. In addition to de-asserting the Tx_DATA_ENABLE port, the WR_PTR is stalled at 1910 as data is not written to the Tx_FIFO buffer instance.

When the FIFO_full marker is not 1 at 1908, indicating that the Tx_FIFO buffer instance has not reached the maximum fill value, the method proceeds to 1912 and a check is made whether the mode to assert and de-assert the Tx_DATA_ENABLE port is a fixed mode. The check may be made based on value of a configurable register bit fixed_mode_en. For example, when the value of the register bit fixed_ mode_en is 0, it is determined that the Tx_DATA_ENABLE port is to be asserted in the burst mode, and when the value of the register bit fixed_mode_en is 1, it is determined that the Tx_DATA_ENABLE port is to be asserted in the fixed mode.

When the value of the register bit is 0, the method proceeds to 1914 and the Tx_DATA_ENABLE port is asserted and the WR_PTR is incremented. As explained earlier, because the MAC core instance writes to the Tx_FIFO buffer instance at the frequency of 501 MHz and the PHY macro instance writes to the peripheral device from the Tx_FIFO buffer instance at the frequency of 125 MHz, 250 MHz, or 500 MHz, the Tx_FIFO buffer instance fill level increases as long as the Tx_DATA_ENABLE port is asserted. This may increase latency as more data remains accumulated in the Tx_FIFO buffer instance and more time is taken to write the accumulated data to the peripheral device. To prevent this, the FIFO_FULL marker may be adjusted to a lower fill level of the Tx_FIFO buffer instance resulting in a lesser filling of the Tx_FIFO buffer instance. Thus, using a configurable maximum and minimum fill levels of the Tx_FIFO buffer instance, the latency may be readily controlled.

When the value of the register bit is 1, the method proceeds to 1916 and a determination is made whether a clock signal of the PCLK is a $501^{st}$ clock signal or a multiple of $501^{st}$ clock signal. A cycle which is a $501^{st}$ cycle or a multiple of $501^{st}$ cycle is hereinafter referred to as a 501 cycle.

If the cycle is the 501 cycle, the method proceeds to 1918 and a skip 501 cycle is performed. In the skip 501 cycle, a decision is made whether to assert the Tx_DATA_ENABLE port during the 501 cycle. A need for the skip 501 cycle is illustrated with an example in which the PCLK has the frequency of 501 MHz, and the TCLK has the frequency of 500 MHz. Because the frequency of the TCLK is 500/501 times the frequency of the PCLK, it is necessary to de-assert the Tx_DATA_ENABLE port once every 501 clock signals of the PCLK to perform rate matching between the PCLK and the TCLK.

As described earlier, when the Tx_DATA_ENABLE port is de-asserted, the fill level of the Tx_FIFO buffer instance decreases. If the actual frequency of the TCLK is 500 MHz during the 501 cycle, the fill level of the Tx_FIFO buffer instance may not decrease below the minimum fill level of the Tx_FIFO buffer instance. However, if the actual frequency of the TCLK during the 501 cycle is more than 500 MHz due to PPM variations, the data written to the Tx_FIFO buffer instance is written to the peripheral device at a faster rate which may result in the fill level of the Tx_FIFO buffer instance decreasing below the minimum fill level. As explained earlier, this may cause data corruption. Similar situation may also arise with TCLK of frequency of 250 MHz or 125 MHz. Thus, during each 501 cycle, a determination is made whether the fill level of the Tx_FIFO buffer instance is adequate to accommodate a highest possible actual frequency of the TCLK due to PPM variations. In an example, the adequate fill level of the Tx_FIFO buffer instance may be two, i.e., two memory blocks. If it is determined that the fill level of the Tx_FIFO buffer instance is adequate to accommodate the highest possible actual frequency of the TCLK, it is determined that the Tx_DATA_ENABLE port may be de-asserted during the 501 cycle. If not, the Tx-_DATA_ENABLE port is asserted. In an example implementation, the Tx_DATA_ENABLE port is asserted once every two 501 cycles. Thus, using the skip 501 cycle, the corruption of data due to PPM variations is eliminated. Although the skip 501 cycle is illustrated with a frequency of 501 MHz, it may be understood that the cycle may be implemented with any frequency of the PCLK.

If the cycle is not the 501 cycle, the method proceeds to 1920 and a determination is made whether the PCIe generation of the TCLK is 3, i.e., whether the frequency of the TCLK is 500 MHz. When the PCIe generation of the TCLK is 3, the method proceeds to 1922 and a modulo-1 counter counts a value of 0 during each cycle. When the value of 0 is counted by the modulo-1 counter, the Tx_DATA_ENABLE port is asserted at 1914.

If the PCIe generation of the TCLK is not 3, the method proceeds to 1924 and a determination is made whether the PCIe generation of the TCLK is 2. If the PCIe generation of the TCLK is 2, then the method proceeds to 1926 and a modulo-2 counter counts 0 and 1 alternately. When the value 0 is counted, the Tx_DATA_ENABLE port is asserted at 1914. When the modulo-2 counter counts a value of 1, the Tx_DATA_ENABLE port is de-asserted at 1910. Thus, when the TCLK is the PCIe generation 2 clock, the Tx-_DATA_ENABLE port is asserted once in two cycles of the PCLK to achieve rate matching.

If the PCIe generation of the TCLK is not 2, PCIe generation of the TCLK is determined to be 1. The method proceeds to 1928 and a modulo-4 counter counts values of 0, 1, 2, and 3. When the value 0 is counted, the Tx_DATA_ENABLE port is asserted. Otherwise, the Tx_DATA_ENABLE port is de-asserted. Thus, when the TCLK is the PCIe generation 1 clock, the Tx_DATA_ENABLE port is asserted once in four cycles of the PCLK.

In an implementation, the modulo-4, the modulo-2, and the modulo-1 counters may be reset when the PIPE_RSTB signal is reset to ensure that the counters start counting from 0 when the device starts from the reset mode.

It may be understood that the asserting and the de-asserting of the Tx-_DATA_ENABLE port based on the PCIe generation of the TCLK ensures that cross clock compensation between the PHY macro instance and the MAC core instance is achieved when the MAC core instance writes data to the PHY macro instance.

As explained above, the WR_PTR is incremented and stalled based on assertion and de-assertion of the Tx_DATA_ENABLE port. The incrementing and the stalling of the RD_PTR will now be explained in greater detail with reference to FIG. 20.

Figure 20:
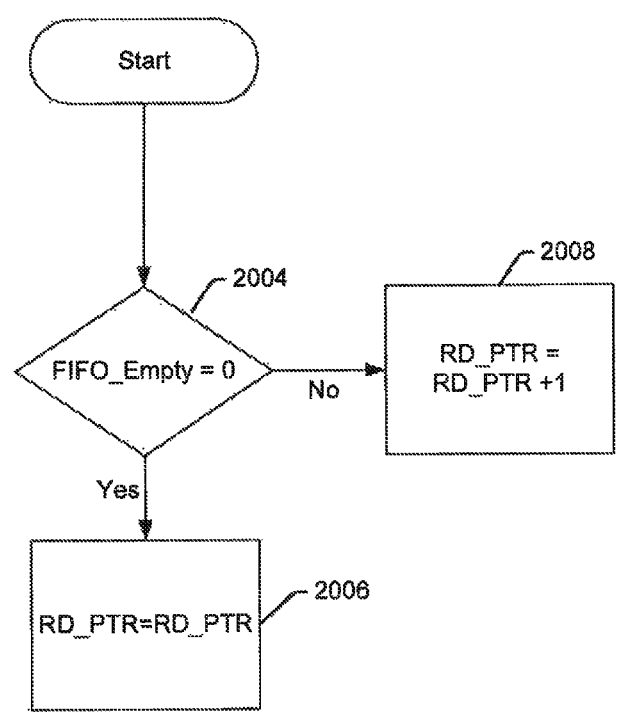
FIG. 20 is a flow chart of a method for controlling a read pointer (RD_PTR) in accordance with another aspect of the present disclosure.

FIG. 20 is a flow chart of a method for incrementing and stalling the RD_PTR while writing data from the Tx_FIFO buffer instance to the peripheral device. The method shown in FIG. 20 may be implemented by, for example, a FIFO controller logic included within the PCIe bus 1200 shown in FIG. 12. The FIFO controller logic repeats the method at the frequency of the TCLK as the data in the Tx_FIFO buffer instance is written to the peripheral device at the frequency of TCLK. As shown in FIG. 20, at 2004 a determination is made whether the FIFO_EMPTY marker is high. When the FIFO_EMPTY marker is high, data cannot be read from the Tx_FIFO buffer instance to write to the peripheral device as it may lead to data corruption. Thus, at 2006, the RD_PTR is stalled. When the FIFO_EMPTY marker is low, the method proceeds to 2108 and the data is written to the peripheral device and the RD_PTR is incremented.

Figure 21:
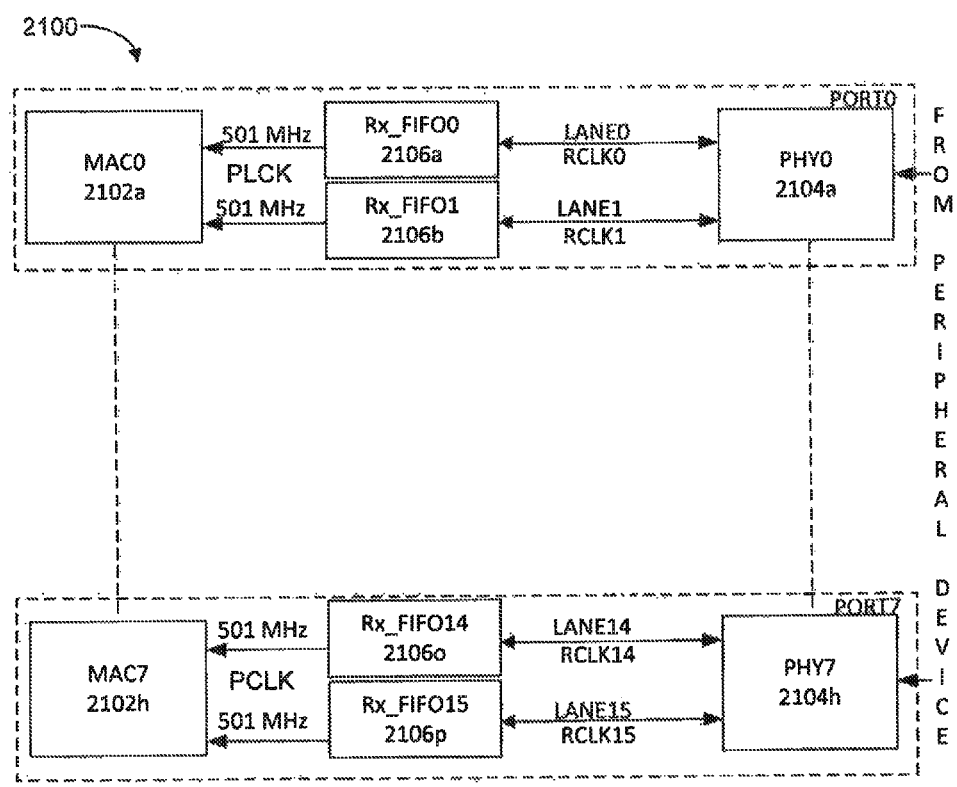
FIG. 21 is a block diagram of a PCIe bus having bifurcated ports in accordance with another aspect of the present disclosure.

FIG. 21 is a block diagram of a PCIe bus 2100 that shows a read operation of the MAC layer from the PHY layer when the PCLK has the frequency of 501 MHz. As shown in FIG. 21, the PCIe bus 2100 is birfurcated to form 8 ports: PORT0, . . . , PORT7. Each port includes a MAC core instance 2101a-2102h and a PHY macro instance 2104a-2104h. Each port also includes two lanes LANE0, LANE1... LANE14, LANE15 two Rx_FIFO buffer instances 2106a-1206p, one per each lane. In the example MAC-PHY bus 2100 shown in FIG. 21, the Rx_FIFO buffer instances 2106a-2106p are shown outside their corresponding PHY macro instances 2104a-2104h for the sake of clarity. However, it will be understood that the Rx_FIFO buffer instances 2106a-2106p may be provided within their corresponding PHY macro instances 2104a-2104h in other examples.

The Rx_FIFO buffer instances 2106a-2106p may be, for example, elastic buffers. Data is first read by a PHY macro instance 2104a-2104h from a peripheral device (not shown) and is written into an Rx_FIFO buffer instance 2106a-2106p at a frequency RCLK. The RCLK may be 500 MHz, 250 MHz, or 125 MHz based on the PCIe generation of the MAC-PHY bus 2100. The read data is read by a corresponding MAC core instance 2102a-2102h at a frequency of PCLK frequency that is set higher than the RCLK frequency when the Rx_FIFO buffer instance 2106a-2106p asserts the Rx_DATA_ENABLE port. For example, the PCLK frequency may be sent to 501 MHz. Because the PCLK frequency is always greater than the RCLK frequency, the fill level of the Rx_FIFO buffer instance decreases when a backpressure Rx_DATA_ENABLE port (not shown) is asserted. To avoid the Rx_FIFO buffer instance 2106a-2106p from becoming empty, the Rx_FIFO buffer instance 2106a-2106p may de-assert the Rx_DATA_ENABLE port. In some examples, a FIFO controller logic (not shown) may determine when to assert and de-assert the Rx_DATA_ENABLE port based on a "burst mode" or a "fixed mode".

Because the Rx_FIFO buffer instance 2106a-2106p gets emptied at a rate faster than a rate at which it gets filled, a small sized Rx_FIFO buffer instance 2106a-2106p may be provided for the read operation. A smaller Rx_FIFO buffer instance 2106a-2106p also reduces the latency as limited amounts of data are stored in the Rx_FIFO buffer instance 2106a-2106p at any given time. Also, because the Rx_DATA_ENABLE port is de-asserted to prevent the Rx_FIFO buffer instance 2106a-2106p from becoming empty, the SKIP ordered sets for rate matching may be eliminated. The elimination of the SKIP ordered sets further decreases latency and required size of the Rx_FIFO buffer instance.

Figure 22:
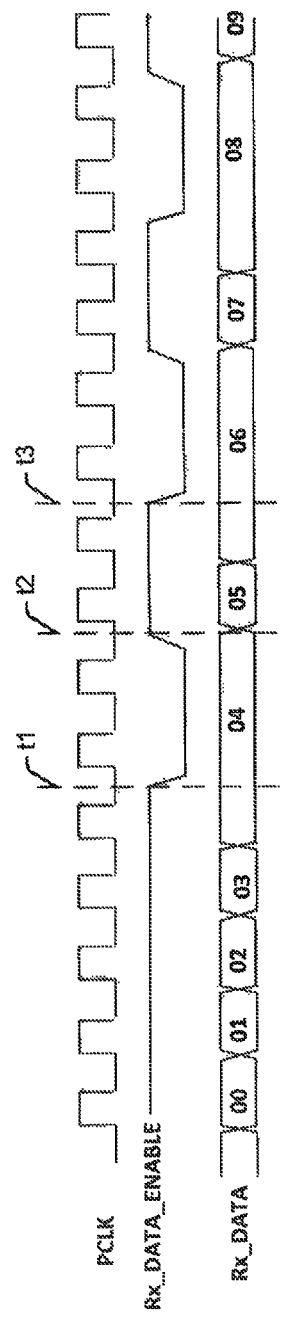
FIG. 22 is a timing diagram illustrating asserting and de-asserting a Rx-_DATA_ENABLE port in a burst mode to control reading Rx_DATA from the Rx_FIFO buffer instance in accordance with another aspect of the present disclosure.

FIG. 22 shows a timing diagram that illustrates an example of asserting and de-asserting a Rx_DATA_ENABLE port in the burst mode to control reading Rx_DATA from a Rx_FIFO buffer instance by a MAC core instance when the RCLK is a Gen1 clock. As shown in FIG. 22, the Rx_DATA_ENABLE port is de-asserted at a time t1 when the Rx_FIFO buffer instance reaches a minimum fill level. The minimum fill level may be the zero fill level. The Rx_DATA_ENABLE port remains de-asserted until a second time t2. During an interval of time from the time t1 to the time t2, the Rx_FIFO buffer instance reads the Rx_DATA from the peripheral device at the frequency of RCLK, which, in the example shown, is 125 MHz. The numbers 00, 01, 02, etc. of Rx_DATA represent units of data read from the Rx-FIFO by the MAC core instance.

Because the MAC core instance is not reading the Rx_DATA from the Rx_FIFO buffer instance and the Rx_FIFO buffer instance reads the Rx_DATA from the peripheral device during the time interval from t1 to t2, the fill level of the Rx_FIFO buffer instance increases. At the time t2, when the Rx_FIFO buffer instance reaches an acceptable fill level due to increase in the fill level, the Rx_DATA_ENABLE port is asserted again. The acceptable fill level may be a total size of the Rx_FIFO buffer instance. Thereafter, the Rx-_DATA_ENABLE port remains asserted until the time t3 when the Rx_FIFO buffer instance again reaches the minimum fill level. Similar to the Tx FIFO buffer instance, the maximum and the minimum fill levels of the Rx_FIFO buffer instance may be indicated by the FIFO_FULL and the FIFO empty markers respectively.

Figure 23:
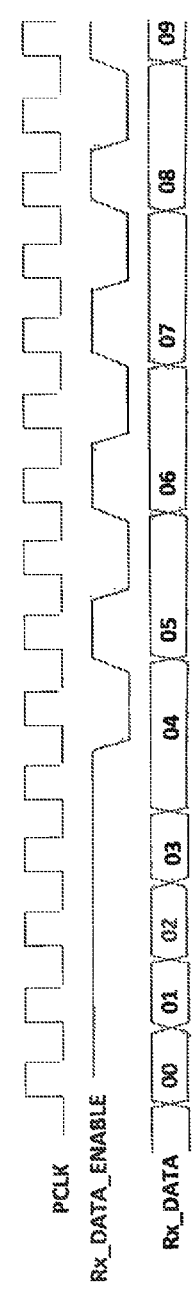
FIG. 23 is a timing diagram illustrating asserting and de-asserting a Rx-_DATA_ENABLE port in a burst mode to control reading Rx_DATA from the Rx_FIFO buffer instance in accordance with another aspect of the present disclosure.

FIG. 23 shows a timing diagram illustrating and example of asserting and de-asserting the Rx_DATA_ENABLE port in the burst mode to control reading the Rx_DATA from the Rx_FIFO buffer instance by the MAC core instance when the RCLK is a Gen2 clock. As shown in FIG. 23, the Rx_DATA_ENABLE port is asserted and de-asserted at different instances of time based on the fill level of the Rx_FIFO buffer instance compared to the example shown in FIG. 22.

Figure 24:
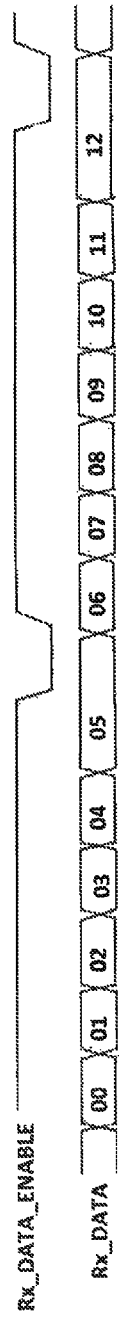
FIG. 24 is a timing diagram illustrating asserting and de-asserting a Rx-_DATA_ENABLE port in a burst mode to control reading Rx_DATA from the Rx_FIFO buffer instance in accordance with another aspect of the present disclosure.

FIG. 24 is a timing diagram illustrating an example of asserting and de-asserting the Rx_DATA_ENABLE port in the burst mode to control reading Rx_DATA from the Rx_FIFO buffer instance by the MAC core instance when the RCLK is a Gen3 clock. It may be noted that the Rx_DATA_ENABLE port is asserted for longer periods of time compared to that of FIG. 22 and FIG. 23. This is due to the higher frequency of the RCLK of FIG. 24 (500 MHz) compared to the frequency of the RCLK of FIGS. 22 (125 MHz) and 23 (250 MHz). Because the frequency of the RCLK of FIG. 24 is higher compared to the frequency of the RCLK of FIGS. 22 and 23, the Rx_DATA is read by the Rx_FIFO buffer instance of FIG. 24 at a frequency faster than a frequency of FIGS. 22 and 23. Therefore, the Rx_FIFO buffer instance reaches the minimum fill level slower than it does when the RCLK is a Gen1 clock or a Gen2 clock and thus, the Rx_DATA_ENABLE port is asserted for longer periods of time.

Figure 25:
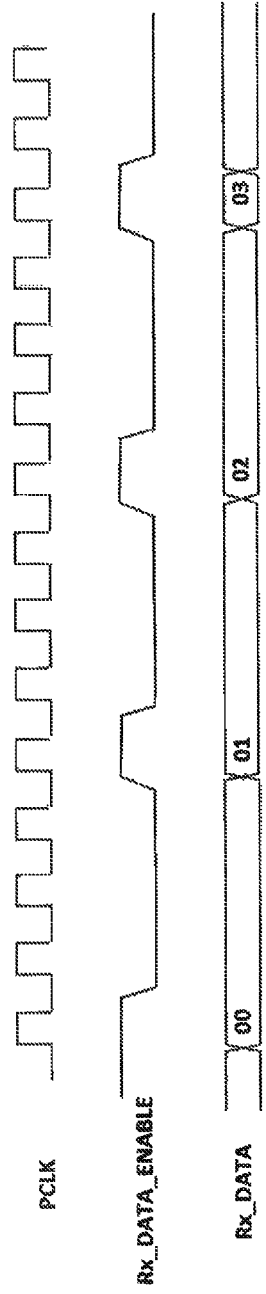
FIG. 25 is a timing diagram illustrating asserting and de-asserting a Rx-_DATA_ENABLE port in a fixed mode to control reading Rx_DATA from the Rx_FIFO buffer instance in accordance with another aspect of the present disclosure.

FIG. 25 is a timing diagram illustrating an example of asserting and de-asserting the Rx_DATA_ENABLE port in the fixed mode to control reading Rx_DATA from the Rx_FIFO buffer instance by the MAC core instance when the RCLK is the Gen1 clock. As shown in FIG. 25, the Rx_DATA_ENABLE port is asserted once in four cycles of the PCLK. In other words, the Rx_DATA_ENABLE port is de-asserted three out of four cycles of the PCLK as the frequency of the PCLK is almost four times the frequency of the RCLK.

Figure 26:
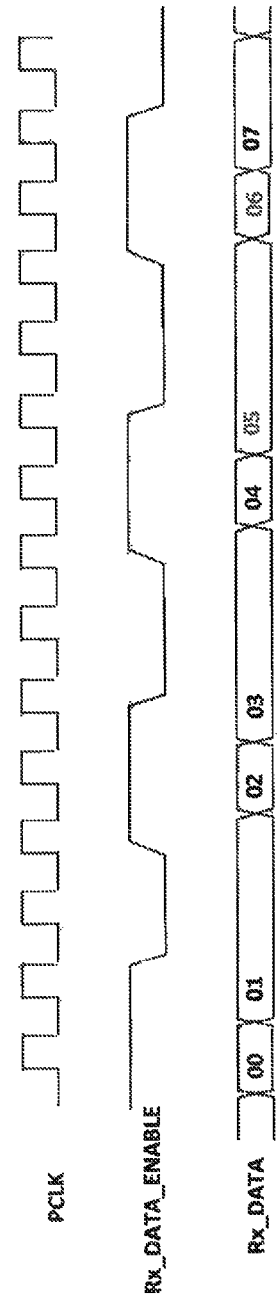
FIG. 26 is a timing diagram illustrating asserting and de-asserting a Rx-_DATA_ENABLE port in a fixed mode to control reading Rx_DATA from the Rx_FIFO buffer instance in accordance with another aspect of the present disclosure.

FIG. 26 is a timing diagram illustrating an example of asserting and de-asserting the Rx_DATA_ENABLE port in the fixed mode to control reading Rx_DATA from the Rx_FIFO buffer instance by the MAC core instance when the RCLK is the Gen2 clock. As shown in FIG. 26, the Rx_DATA_ENABLE port is asserted once in two cycles of the PCLK. In other words, the Rx_DATA_ENABLE port is de-asserted two out of four cycles of the PCLK as the frequency of the PCLK is almost two times the frequency of the RCLK.

The assertion and de-assertion of the Rx DATA _ ENABLE port to control reading data from the PHY layer by the MAC layer is explained in greater detail with reference to FIG. 27.

Figure 27:
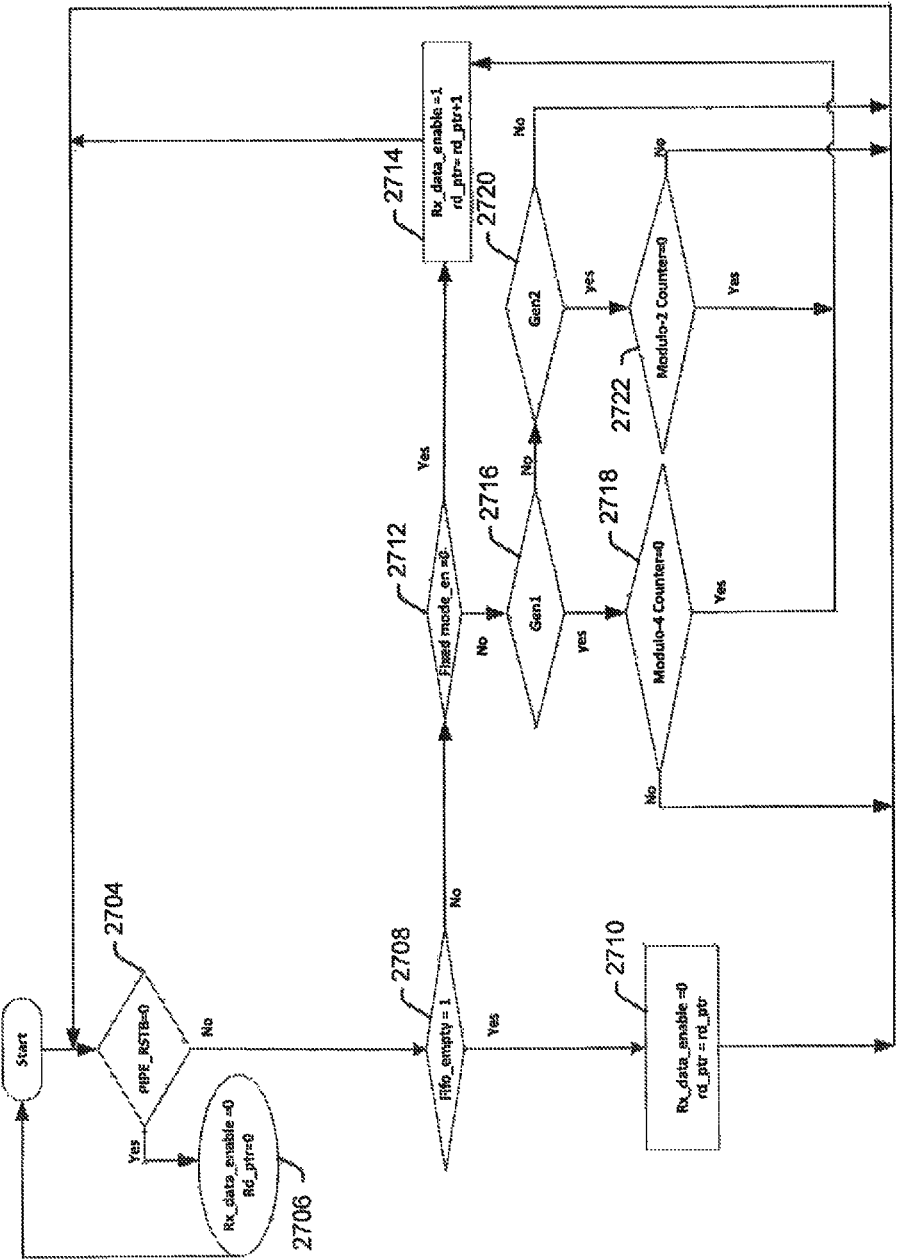
FIG. 27 is a flow chart showing a for controlling a Rx_DATA_ENABLE port in accordance with another aspect of the present disclosure.

FIG. 27 is a flow chart showing a method for determining when to assert the Rx_DATA_ENABLE port for the Rx_FIFO buffer instance for different PCIe generations of the RCLK. The method of FIG. 27 may be performed by, for example, a FIFO controller logic of the PCIe bus 2100 shown in FIG. 21.

At 2704, a status of PIPE_RSTB is checked. When PIPE_RSTB is reset, at 2706, the Rx_DATA_ENABLE port is de-asserted and the RD_PTR of the Rx_FIFO buffer instance is reset. If the signal PIPE_RSTB is not reset, the method proceeds to 2708 and the FIFO_EMPTY marker is checked. If the FIFO_EMPTY marker has a value of 1, the Rx-_DATA_ENABLE port remains de-asserted at 2710 as the Rx_FIFO buffer instance has reached its minimum fill level and further reading from the Rx_FIFO buffer instance may lead to data corruption. The minimum fill level of the Rx_FIFO buffer instance may be, for example, 2.

If the FIFO_EMPTY marker has a value of 0, the method proceeds to 2712 and a determination is made whether the mode is the fixed mode or the burst mode. The determination of the mode may be based, for example, on value of a configurable register bit fixed_mode_en. For example, if the value of the register bit fixed_mode_en is 0, it is determined that the mode is the burst mode and the method proceeds to 2714 where the Rx-_DATA_ENABLE port is asserted. If the value of the register bit fixed_mode_en is 1, the method proceeds to 2716 where a determination is made whether the PCIe generation of the RCLK is 1.

If the PCIe generation of the RCLK is 1, then the method proceeds to 2718 and a modulo-4 counter counts values of 0, 1, 2 and 3. When the value 0 is counted, the Rx-_DATA_ENABLE port is asserted. Otherwise, the Rx_DATA_ENABLE port is de-asserted. Thus, when the RCLK is the PCIe generation 1 clock, the Rx_DATA_ENABLE port is asserted once in four cycles of the PCLK.

If the PCIe generation of the RCLK is not 1, the method proceeds to 2720 and a determination is made whether the PCIe generation of the RCLK is 2. If the PCIe generation of the RCLK is 1, the method proceeds to 2722 and a modulo-2 counter counts values of 0 and 1 alternately. When the value 0 is counted, the Rx_DATA_ENABLE port is asserted. Otherwise, the Rx_DATA_ENABLE port is de-asserted. Thus, when the RCLK is the PCIe generation 2 clock, the Rx_DATA_ENABLE port is asserted once in two cycles of the PCLK.

If the PCIe generation of the RCLK is neither 1 nor 2, the Rx_DATA_ENABLE port is asserted as it means that the PCIe generation of the RCLK is 3 and in case of Gen3 RCLK, the Rx_DATA_ENABLE port can be asserted during all clock signals of the PCLK provided the FIFO_EMPTY marker of the Rx_FIFO buffer instance is high.

In an implementation, the modulo-4 and the modulo-2 counters may be reset when the PIPE_RSTB signal is reset to ensure that the counters start counting from 0 when the device starts from the reset mode.

It may be noted that, every time the Rx_DATA_ENABLE port is asserted, the RD_PTR is incremented as data is read from the Rx_FIFO buffer instance by the MAC core instance.

Figure 28:
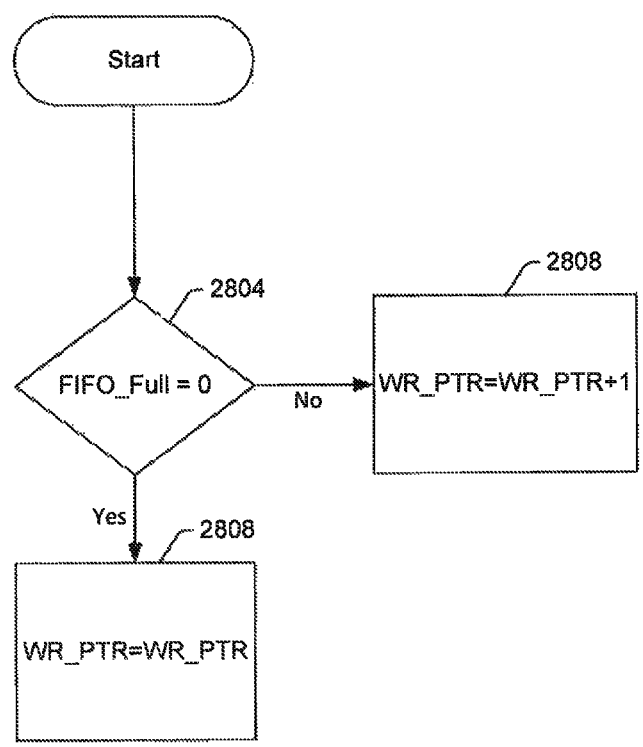
FIG. 28 is a flow chart of a method for controlling a write pointer (WR_PTR) in accordance with another aspect of the present disclosure.

FIG. 28 is a flow chart showing an example method for incrementing and stalling WR_PTR of the Rx_FIFO buffer instance when the PHY macro instance reads data from the peripheral device and writes the read data to the Rx_FIFO buffer instance. The method of FIG. 28 may be performed by, for example, a FIFO controller logic of the PCIe bus 2100 shown in FIG. 21.

The method repeats at the frequency of the RCLK as the PHY macro instance reads the data from the peripheral device at the frequency of TCLK. As shown in FIG. 28, at 2804, it is determined whether the FIFO_FULL marker of the Rx_FIFO buffer instance is high. When the FIFO_FULL marker is high, data cannot be written to the Rx_FIFO buffer instance as it may lead to Rx_FIFO buffer instance overflow and consequently data loss. Thus, at 2806, the WR_PTR is stalled. When the FIFO_FULL marker is low, the data is sent from the peripheral device to the Rx_FIFO buffer instance and the WR_PTR is incremented.

Figure 29A:
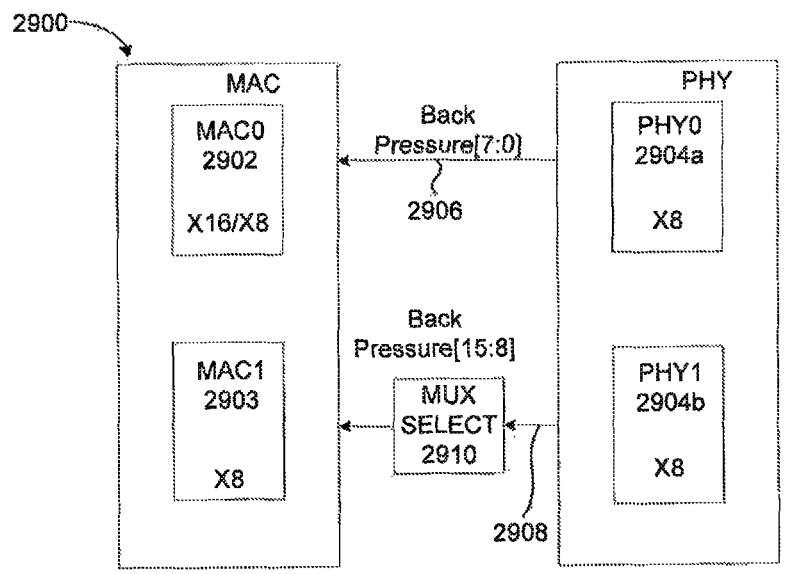
FIGS. 29a and 29b are block diagrams of a PCIe bus that is configurable between two 8-port buses and a single 16-port bus according to another aspect of the disclosure.
Figure 29B:
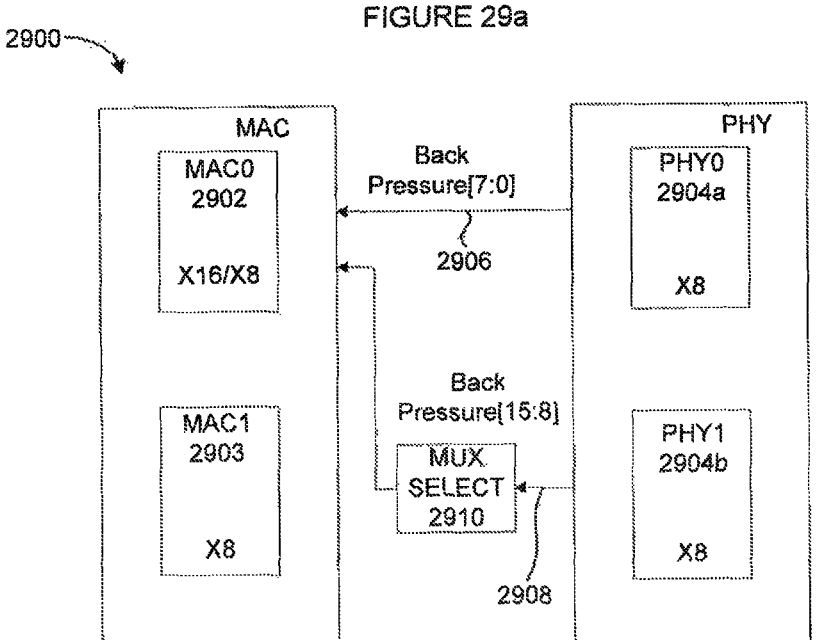

FIGS. 29*a* and 29*b* are block diagrams of a PCIe bus 2900 having bifurcated ports having backpressure ports, where the PCIe bus 2900 may be selectively configured to operate as two 8-port independent buses (FIG. 29*a*) or a single 16-port bus (FIG. 29*b*). The example PCIe bus 2900 includes a first MAC core instance 2902 which may operate as either an 8-port MAC core or a 16-port MAC core and a second MAC core instance 2903 which is an 8-port MAC core. The example MAC-PHY PCIe bus 2900 includes two 8-port PHY macro instances 2904*a*, 2904*b*. A first set of eight back pressure ports 2906 are coupled between the eight lanes of the 8-port PHY macro instance 2904*a* and eight of the ports of the first MAC core instance 2902. A second set of eight back pressure ports 2908 are coupled via a MUX select switch 2910 between the second PHY macro instance 2904*b* and one of the first MAC core instance 2902 and the second MAC instance 2903.

By configuring the MUX select switch 2910 to couple the second set of backpressure ports 2908 to couple the PHY macro instance 2904*b* with the second MAC core instance 2903, as shown in FIG. 29*a*, the PCIe bus 2900 operates as two independent 8-port buses, with the first MAC core instance 1202 and the PHY macro instance 2904*a* forming the first 8-port bus, and the second MAC core instance 2902 and the second PHY macro instance 2904*b* forming the second 8-port bus.

By switching the MUX select switch 2910 such that the second set of backpressure ports 2908 are connected to the first MAC core instance 2902, as shown in FIG. 29*b*, the PCIe bus 2900 operates as a single 16-port bus with all sixteen ports of the first MAC core instance 2902 connected to the 8-ports of the first and second PHY macro instances 2904*a*, 2904*b*. In this configuration, the second MAC core instance 2903 is not utilized.

Although the example PCIe bus 2900 shown in FIGS. 29*a* and 29*b* includes one MAC core instance that is configurable as an 8-port or a 16-port MAC core instance, it is understood that this concept can be scaled to include other numbers of configurable MAC core instances having other numbers of configurations of ports, including corresponding MUX select switches. The PCIe bus 2900 may also have more than two PHY macro instances.

Thus, the methods and systems of the present disclosure eliminate the use of looping and balancing of clocks to prevent data loss and corruption due to PPM variation of various clocks signals. The elimination of looping and balancing of clocks significantly reduces complexity involved in implementing port bifurcation.

The methods and systems of the present disclosure also provide increased frequency of the PCLK with respect to the RCLK which helps in minimizing size of buffer instance required for receiving data from the peripheral device as reading of data from the buffer instances always happen at a greater frequency than the frequency at which data is written to the buffer instance. This also decreases latency in receiving data from the peripheral device.

The methods and systems of the present disclosure also provide different modes of writing data to and reading from buffer instances. The fixed mode enables minimizing latency as buffer instance is filled to a limited fill level due to rate matching. The burst mode ensures a simple design for performing backpressure.

What is claimed is:
1. A Peripheral Component Interconnect express (PCIe) bus adapted for cross clock compensation of asynchronous clocks of the PCIe bus, the PCIe bus comprising:

one or more physical (PHY) data ports provided in a PHY layer, the one or more PHY data ports for communicating with a peripheral device, the PHY layer having a transmit clock (TCLK) for timing transmission of data to the peripheral device and a receive clock (RCLK) for timing receiving data from the peripheral device;

one or more media access control (MAC) ports provided in a MAC layer, the one or more MAC ports for communicating with the PHY layer, the MAC layer having an interface clock (PCLK) for timing transmission of data to the PHY layer and receiving of data from the PHY layer, wherein the PCLK and one or both of the TCLK and the RCLK are asynchronous; and one or more backpressure ports at an interface between the PHY layer and the MAC layer for controlling at least one of reading data and writing data by one of the PHY layer and the MAC layer.

2. The PCIe bus according to claim 1, wherein the one or more backpressure ports control at least one of reading data and writing data by the MAC layer.

3. The PCIe bus according to claim 2, wherein the one or more backpressure ports include a Rx_DATA_ENABLE port such that:

when the Rx_DATA_ENABLE port is asserted, the MAC layer reads data from the PHY layer; and when the Rx_DATA_ENABLE port is de-asserted, the MAC layer does not read data from the PHY layer.

4. The PCIe bus according to claim 3, wherein, when a PCLK frequency is higher than a RCLK frequency, the Rx_DATA_ENABLE port is de-asserted periodically at a first time interval that is based on a difference between the PCLK frequency and the RCLK frequency to compensate for the higher PCLK frequency.

5. The PCIe bus according to claim 2, wherein the one or more backpressure ports include a Tx_DATA_ENABLE port such that:

when the Tx_DATA_ENABLE port is asserted, the MAC layer writes data to the PHY layer; and when the Tx_DATA_ENABLE port is de-asserted, the MAC layer does not write data to the PHY layer.

6. The PCIe bus according to claim 5, wherein, when a PCLK frequency is higher than a TCLK frequency, the TX_DATA_ENABLE port is de-asserted periodically at a second time interval that is based on a difference between the PCLK frequency and the TCLK frequency to compensate for the higher PCKL frequency.

7. The PCIe bus according to claim 2, wherein the PHY layer includes one or more of:

a Tx elastic buffer for providing redundant data to the peripheral device to compensate for a PCLK frequency that is less than a TCLK frequency; and a Rx elastic buffer for storing data received from the peripheral until the MAC layer is ready to read to compensate for the PCLK frequency that is less than a RCLK frequency.

8. The PCIe bus according to claim 1, wherein one or more of the PCLK, TCLK, and RCLK operate on spread spectrum clocking (SSC).

9. The PCIe bus according to claim 1, wherein a PCLK frequency is set higher than both a maximum TCLK frequency and a maximum RCLK frequency.

10. The PCIe bus according to claim 9, wherein the PHY layer does not include elastic buffers connected to the PHY data ports for compensating for differences between the PCLK and the TCLK and the RCLK.

11. The PCIe bus according to claim 1, wherein:

the PHY layer includes a plurality of PHY macro instances; and the MAC layer includes a plurality of MAC core instances;

wherein the backpressure ports are provided at an interface between each of the PHY macro instances of the PHY layer and one or more MAC core instances of the MAC layer.

12. A method of controlling a Peripheral Component Interconnect express (PCIe) bus to provide cross clock compensation, the PCIe bus having a physical (PHY) layer having one or more PHY data ports for communicating with a peripheral device, the PHY layer having a transmit clock (TCLK) for timing transmission of data to the peripheral device and a receive clock (RCLK) for timing receiving of data from the peripheral device, a media access control (MAC) layer having one or more MAC data ports for communicating with the PHY layer, the MAC layer having an interface clock (PCLK) for timing transmission of data to the PHY layer and receiving of data from the PHY layer, wherein the PCLK and one or both of the TCLK and the RCLK are asynchronous, and one or more backpressure ports at an interface between the PHY layer and the MAC layer for controlling at least one of reading data and writing data by one of the PHY layer and the MAC layer, the method comprising:

signaling, via the one or more backpressure ports at the interface between the PHY layer and the MAC layer, one of the PHY layer and the MAC layer to:

activate, for a first time period, one of reading and writing by the one of the PHY layer and the MAC layer; and de-activate, for a second time period, one of reading or writing by the one of the PHY layer and the MAC layer;

wherein the first time period and the second time period compensate for a difference between a PCLK frequency and either a TCLK frequency or a RCLK frequency.

13. The method according to claim 12, further comprising setting the PCLK frequency greater than the maximum TCLK frequency and the maximum RCLK frequency.

14. The method according to claim 13, wherein signaling comprises signaling the MAC layer to activate or de-activate one of reading from and writing to the PHY layer.

15. The method according to claim 14, wherein, in a burst mode, signaling comprises:

signaling the MAC layer, via a Tx_DATA_ENABLE backpressure port, to activate writing of data to a buffer of the PHY layer when the buffer meets or is less than a first fill threshold; and signaling the MAC layer, via the Tx_DATA_ENABLE backpressure port, to de-activate writing of data to the buffer of the PHY layer when the buffer meets or exceeds a second fill threshold that is greater than the first fill threshold.

16. The method according to claim 14, wherein, in a burst mode, signaling comprises:

signaling the MAC layer, via a Rx_DATA_ENABLE backpressure port, to activate reading of data from a buffer of the PHY layer when the buffer meets or is less than a third fill threshold; and signaling the MAC layer, via the Rx_DATA_ENABLE backpressure port, to de- activate reading of data from the buffer of the PHY layer when the buffer meets or exceeds a fourth fill threshold that is less than the third fill threshold.

17. The method according to claim 14, further comprising, in a fixed mode:
    determining a difference between the PCLK frequency and the TCLK frequency; and
    wherein signaling comprises:
    signaling the MAC layer, via a Tx_DATA_ENABLE backpressure port, to activate writing of data to a buffer of the PHY layer; and
    periodically signaling the MAC layer at a first time interval, via the Tx_DATA_ENABLE backpressure port, to de-activate writing of data to the buffer of the PHY layer for a first period, wherein the first time interval between de-activating writing of data and the first period are determined based on the difference between the PCLK frequency and the TCLK frequency to rate match the PCLK frequency to the TCLK frequency.

18. The method according to claim 17, further comprising determining the first time interval between de-activating writing of data and the first period based on the generation of the PCIe standard utilized by the PCIe bus.

19. The method according to claim 14, further comprising, in a fixed mode:
    determining a difference between the PCLK frequency and the RCLK frequency; and
    wherein signaling comprises:
    signaling the MAC layer, via a Rx_DATA_ENABLE backpressure port, to activate reading of data from a buffer of the PHY layer; and
    periodically signaling the MAC layer at a second time interval, via the Rx_DATA ENABLE backpressure port, to de-activate reading of data from the buffer of the PHY layer for a second period, wherein the second time interval between de-activating writing of data and the second period are determined based on the difference between the PCLK frequency and the RCLK frequency to match the rate of the PCLK frequency to the RCLK frequency.

20. The method according to claim 19, further comprising determining the second time interval between de-activating reading of data and the second period based on the generation of the PCIe standard utilized by the PCIe bus.

* * * * *

UNITED STATES PATENT AND TRADEMARK OFFICE
CERTIFICATE OF CORRECTION

PATENT NO. : 9,880,949 B1
APPLICATION NO. : 14/966240
DATED : January 30, 2018
INVENTOR(S) : Kiran Hanchinal et al.

Page 1 of 1

It is certified that error appears in the above-identified patent and that said Letters Patent is hereby corrected as shown below:

In the Specification
Column 1, Line 51, Delete "POLK" and insert --PLCK--, therefor.

Signed and Sealed this
Sixteenth Day of October, 2018

Andrei Iancu
*Director of the United States Patent and Trademark Office*